US007452950B2

(12) United States Patent
Dunaev et al.

(10) Patent No.: US 7,452,950 B2
(45) Date of Patent: *Nov. 18, 2008

(54) PHOTOCHROMIC MONOMERS, PHOTOCHROMIC POLYMERS BASED ON THE SAME, PHOTOCHROMIC RECORDING MEDIA COMPRISING THE PHOTOCHROMIC POLYMERS, AND 3D READ/WRITE OPTICAL MEMORY COMPRISING THE RECORDING MEDIA

(75) Inventors: Alexandr Alexandrovich Dunaev, Moscow (RU); Mikhail Vladimisovich Alfimov, Moscow (RU); Valery Alexandrovich Barachevsky, Moscow (RU); Valery Alexandrovidh Vasnev, Moscow (RU); Igor Victorovich Zavarzin, Moscow (RU); Sergey Nikolaevich Ivanov, Moscow (RU); Mukhammed Lastanbievich Keshtov, Moscow (RU); Ajexel Ivanovich Kovalev, Moscow (RU); Mikhall Mikhallovich Krayushkin, Moscow (RU); Yury Alexandrovich Pyankov, Dolgoprudnil (RU); Alexandr Lyovich Rusanov, Moscow (RU); Yury Petrovich Strokach, Dolqoprudnll (RU); Vladimir Nikolaevich Yarovenko, Moscow (RU)

(73) Assignees: Samsung Electronics Co., Ltd., Suwon-si (KR); Photochemistry Center of Russian Academy of Sciences, Moscow (RU)

( * ) Notice: Subject to any disclaimer, the term of this patent is extended or adjusted under 35 U.S.C. 154(b) by 60 days.

This patent is subject to a terminal disclaimer.

(21) Appl. No.: 11/234,158

(22) Filed: Sep. 26, 2005

(65) Prior Publication Data
US 2006/0079653 A1    Apr. 13, 2006

(30) Foreign Application Priority Data
Sep. 24, 2004   (RU) ............................... 2004128410

(51) Int. Cl.
C08G 18/40   (2006.01)
G03C 1/73    (2006.01)

(52) U.S. Cl. ....................... 526/204; 526/242; 526/308; 526/319; 526/346; 430/2; 430/18; 430/19; 430/496

(58) Field of Classification Search ........................ None
See application file for complete search history.

(56) References Cited

U.S. PATENT DOCUMENTS 5,936,878 A * 8/1999 Arsenov et al. ............. 365/111
6,787,621 B2 * 9/2004 Kim et al. ................... 526/204
7,041,763 B2 * 5/2006 Branda et al. ............... 526/319
2003/0130456 A1 * 7/2003 Kim et al. ................... 526/242
2004/0030078 A1   2/2004 Branda et al.

FOREIGN PATENT DOCUMENTS

WO   WO 2004/057377   *   8/2004

OTHER PUBLICATIONS

Arthur Thomas Bens et al. "Novel photosensitive polyurethanes based on photochromic dithienylethene monomers", e-Polymers,2003,n.003.*
Masahiro Irie "Diarylethenes for Memories and Switches",Chem. Rev.2000,100,pp. 1685-1716.*
Feringa et al. "Chiroptical Molecular Switches", Chapter 5 of Molecular Switches, 2001.*
Burland, Donald M. et al. "Second—Order Nonlinearity in Poled-Polymer Systems." Chem. Rev., vol. 94, p. 31-75, 1994.
Cho, S.Y. et al. "Preparation of Diarylethene Copolymers and their Photoinduced Refractive indext Change." Optical Materials, vol. 21, pp. 279-284, 2002.
çokgör, I. et al. "Multi-layer Disk Recording using 2-photon Absorption and the Numerical Simulation of the Recording Process." SPIE, vol. 3109, pp. 182-186, 1997.
Dvornikov, Alexander S. et al. "Materials and Systems for Two Photon 3-D ROM Devices." IEEE-Part A, vol. 20, No. 2, pp. 203-212, 1997.
Huang, Zhen-Nian et al. "Facile Synthesis of Novel Photochromic 1,2- Diheteroaryl-Substituted Cycloalkenes by Titanium-Induced Intramolecular Coupling Reaction." Synthesis-Short Papers, Stuttgart 1998, pp. 1092-1094, 1998.
Irie, Masahiro. "Diarylethenes with Heterocyclic Aryl Groups." Organic Photochromic and Thermochromic Compounds. vol. 1. Eds. J.C. Crano and R.J. Guglielmetti. Plenum Press: N.Y. and L., pp. 207-221, 1999.
Kawata, Satoshi et al. "Three-Dimensional Optical Data Storage using Photochromic Materials." Chem. Rev., vol. 100, pp. 1777-1791, 2000.

(Continued)

*Primary Examiner*—Vasu Jagannathan
*Assistant Examiner*—Gennadiy Mesh
(74) *Attorney, Agent, or Firm*—Stein, McEwen & Bui, LLP

(57) ABSTRACT

Photochromic monomers and methods for preparing these photochromic monomers, photochromic polymers based on these photochromic monomers and methods for preparing these photochromic polymers, as well as the use of these photochromic polymers in a polymer binder as a two-photon recording medium for an optical 3D memory and photo-switches of optical signals are disclosed. The materials exhibit thermally irreversible photochromic transformations and other properties enabling the use of the photochromic polymers in an optical two-photon read/write memory.

25 Claims, 8 Drawing Sheets

OTHER PUBLICATIONS

Kim, Eunkyoung et al. "Photoinduced Refractive Index Change of a Photochromic Diarylethane Polymer." *Macromolecules*, vol. 32, pp. 4855-4860, 1999.

Yokoyama, Yasushi, et al. "Absolute Stereochemistry and CD Spectra of Resolved Enantiomers of the Colored Form of a Photochromic Dithienylethene." Chemistry Letters, pp. 1093-1094, 1998.

* cited by examiner

US 7,452,950 B2

PHOTOCHROMIC MONOMERS, PHOTOCHROMIC POLYMERS BASED ON THE SAME, PHOTOCHROMIC RECORDING MEDIA COMPRISING THE PHOTOCHROMIC POLYMERS, AND 3D READ/WRITE OPTICAL MEMORY COMPRISING THE RECORDING MEDIA

CROSS-REFERENCE TO RELATED APPLICATION

This application claims the benefit of Russian Patent Application No. 2004128410, filed on Sep. 24, 2004 in the Russian Intellectual Property Office, the disclosure of which is incorporated herein in its entirety by reference.

BACKGROUND OF THE INVENTION

1. Field of the Invention

An aspect of the present invention relates to a new photochromic monomer, a photochromic polymer based on the same, a photochromic recording medium comprising the photochromic polymers, and a 3D read/write optical memory comprising the recording medium, more particularly to a new photochromic monomer for creating a two-photon photochromic recording medium for a 3D read/write optical memory with bit-by-bit recording of optical information, a photochromic polymers based on the same, a photochromic recording medium comprising the photochromic polymers, and a 3D read/write optical memory comprising the recording medium.

2. Description of the Related Art

Creation of data bases for telecommunication systems is a problem currently facing the information technology area. In this connection, the work is now in progress on developing an optical memory of ultra-high information capacity through the change-over from 2D information carriers to 3D recording media that allow the achievement of an information storage density as maximal as possible (up to 1 Tbit/cm$^3$). For the 3D optical read/write memory to be created, two-photon recording media are required (I. Cokgor, F. B. McCormick, A. S. Dvornikov, M. Wang, N. Kim, K. Koblentz, S. C. Esener, P. M., Rentzepis. Proc. SPIE, vol. 3109, pp. 182-186, 1997; S. Kawata, Y. Kawata, Chem. Rev., vol. 100, pp. 1777-1791, 2000). Such media are being mainly developed in the USA (Call/Recall Corporation, Irvine and San Diego Universities of California) and Japan (Japan Science and Technology Corporation, Kyushu, Osaka, and Shizuoka Universities). Further, the use is made of polymer solutions of thermally irreversible photochromic compounds of different types: diaryl ethenes, fulgides, fulgimides, phenoxy derivatives of phenoxy naphthacene quinone and others. (A. S. Dvornikov, I. Cokgor, M. Wang, F. B. McCormick, S. C. Esener, P. M. Rentzepis. IEEE Transaction. Part A, vol. 20, N2, pp. 203-212, 1997). The compounds of this type are known to provide for the two-photon excitement and, consequently, the optical information recording in the medium volume.

The disadvantage of such recording media is that the photochromic layer is prepared from a monomer photochromic compound of one of the above listed types and a polymer binder. Such a medium essentially represents a molecular solution of the photochromic compound in a polymeric matrix. As a result, a concentration of photochromic molecules and, consequently, a number of photosensitive centers are determined by the ultimate solubility of the compounds in the polymer, that does not generally exceed 10% by the weight of dry polymeric binder. Crystallization processes of the photochromic substances, phase separation, aggregation of the photochromic molecules and formation of photochromic compound concentration gradients in the volume and on the surface of a layer are usually observed in such media (D. M. Buland, R. D. Miller, C. A. Walsh, Chem. Rev., vol. 94, p. 31, 1994). Thus, information capacity and data write/rewrite cyclicity in the photochromic medium are drastically reduced. Furthermore, a quantum yield for the photochromic transformations of some of the most acceptable photochromic compounds and, more particularly, of diaryl ethenes monomers, is not more than $\phi=0.5$ due to the state of chaos in their distribution in the polymer volume (M. Irie. In: Organic Photochromic and Thermochromic Compounds. Eds. J. C. Crano and R. J. Guglielmetti. N. Y. and L., Plenum Press. 1999. V. 1. P.207) and, consequently, a photosensitivity of the photochromic medium does not reach maximum values.

Due to this, of the most interest for the use as two-photon recording media are photochromic polymers comprising valence-bonded photochromic molecules either in the main polymeric chain or as side fragments. In the photochromic polymers, covalently bonded photochromic molecules are more stable in time during the storage owing to hampered migration thereof through the medium volume. The photochromic recording media include, for example, photochromic polymers having diaryl ethene fragments based on styrene and butyl methacrylate monomers (E. Kim, Y. K. Choi, M. H. Lee. Macromolecules, vol. 32, pp. 4855-4860, 1999; S. Y. Cho, H. W. Shin, K. H. Ahn, Y. R. Kim, E. Kim. Optical Materials, vol. 21, pp. 279-284, 2002). In comparison with the polymer solutions, the media of this type enable the formation of high quality layers having a thickness of 0.05-0.1 μm. The developed media allow the optical information recording when exposed to the radiation of a helium-cadmium laser (325 nm) and the erasing by using lasers emitting in the visible spectral range (663 and 532 nm). Nondestructive reading of the recorded information is achieved due to a photo-induced variation of the refractive index ($\Delta n=0.0008$) at the radiation wavelength of a semiconductor laser (830 nm).

Photochromic polymers based on 1,2-bis(3-thienyl)cyclopentene monomer (U.S. Patent Application Publication No. 2004/0030078 have been proposed. A disadvantage of such photochromic polymers is that they use a rather definite structure of the photochromic monomer and of the homopolymers based thereon. The disadvantage is caused by a limited choice of starting reagents for the synthesis of these photochromic polymers.

SUMMARY OF THE INVENTION

An aspect of the present invention provides a new photochromic monomer of diaryl ethenes type, a photochromic polymer based on the new functional photochromic compounds which exhibit a thermal irreversibility of the photochromic transformations and other properties which enable the use of the photochromic polymers for creating a two-photon photochromic recording medium for a 3D read/write optical memory with bit-by-bit recording of optical information, and a producing method thereof.

An aspect of the present invention also provides a photochromic recording medium and a photoswitch of optical signals produced using the photochromic polymers.

According to an aspect of the present invention, there is provided a photochromic monomer of the general formula (I):

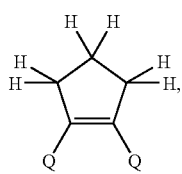

wherein each of the substituents Q is independently selected from below,

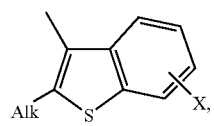 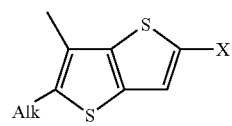

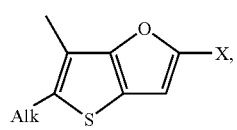 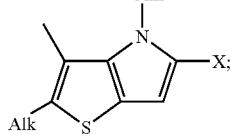

Alk is a C1-10 alkyl group; and X is Cl, Br, I, F, NH2, CH2OH, CH2Cl, CH2Br, CHO, or COOH.

According to another aspect of the present invention, there is provided a photochromic monomer of the general formula (II):

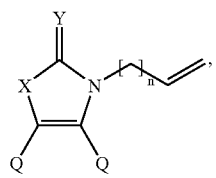

wherein X is CH2, O, S or N-Alk; Y is O, S, or N-Alk; n is any integer of 0~6; each of the substituents Q is independently selected from below,

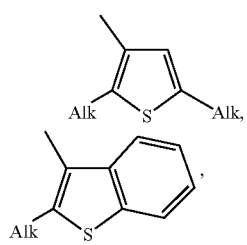 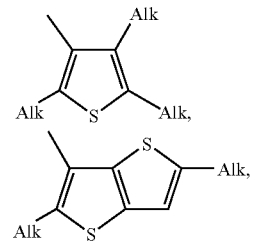

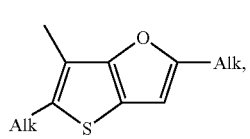 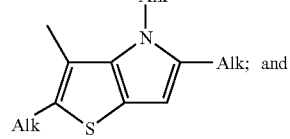

Alk is a C1-10 alkyl group.

According to a still another aspect of the present invention, there is provided a photochromic monomer of the general formula (III):

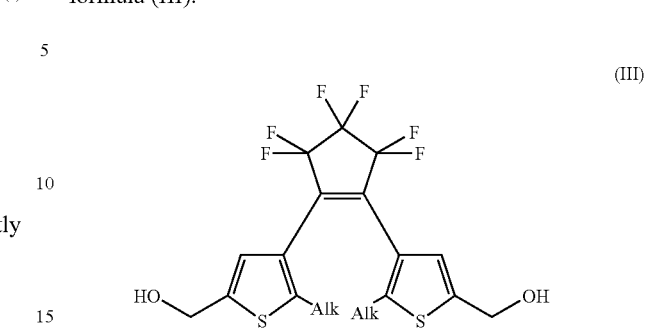

wherein Alk is a C1-10 alkyl group.

According to a still another aspect of the present invention, there is provided a photochromic polymer having a structural unit in a main chain or as a side chain derived from photochromic monomers of the general formula (I):

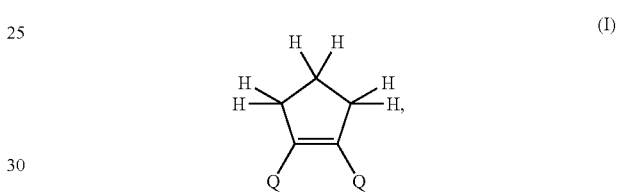

wherein each of the substituents Q is independently selected from below,

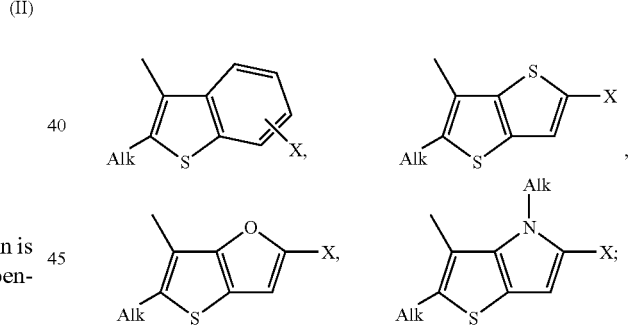

Alk is a C1-10 alkyl group; and X is Cl, Br, I, F, NH2, CH2OH, CH2Cl, CH2Br, CHO, or COOH.

According to a still another aspect of the present invention, there is provided a photochromic polymer having in a main chain a structural unit of the general formula (IXa):

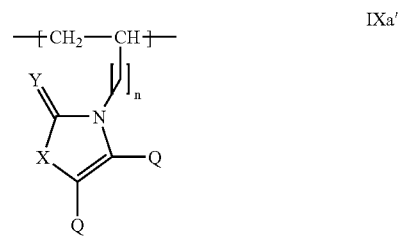

wherein X is CH2, O, S or N-Alk; Y is O, S, or N-Alk; n is any integer of 0~6; each of the substituents Q is independently selected from below,

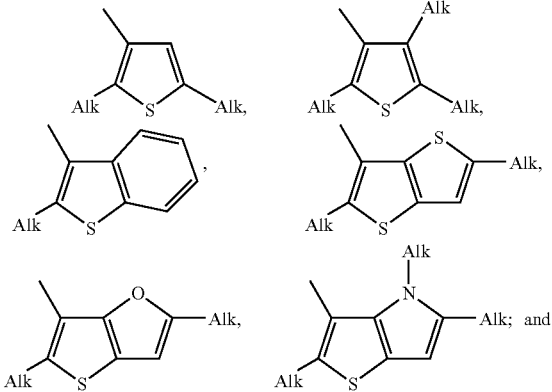

Alk is a C1-10 alkyl group.

According to a still another aspect of the present invention, there is provided a photochromic polymer having in a main chain a structural unit of the general formula (III'):

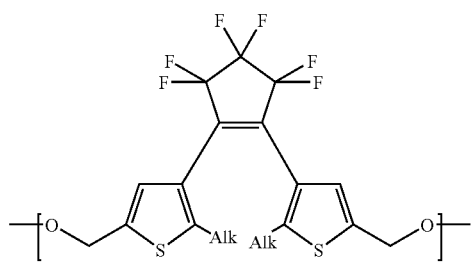

(III')

wherein Alk is a C1-10 alkyl group.

According to a still another aspect of the present invention, there is provided a photochromic polymer mixture comprising: 1~99% by weight of a photochromic polymer to; and 99~1% by weight of a polymer binder, the photochromic polymer having a structural unit in a main chain or as a side chain derived from photochromic monomers of the general formula (I):

(I)

H H
H H
H H
Q Q wherein each of the substituents Q is independently selected from

[structures with Alk, S, O, N-Alk groups and X substituent]

Alk is a C1-10 alkyl group; and X is Cl, Br, I, F, NH2, CH2OH, CH2Cl, CH2Br, CHO, or COOH.

According to an aspect of the invention, the photochromic polymer of the photochromic polymer mixture is a copolymer of the chemical formula (IV):

wherein n is a positive integer.

According to an aspect of the invention, the photochromic polymer of the photochromic polymer mixture has in a main chain a structural unit of the general formula (IXa):

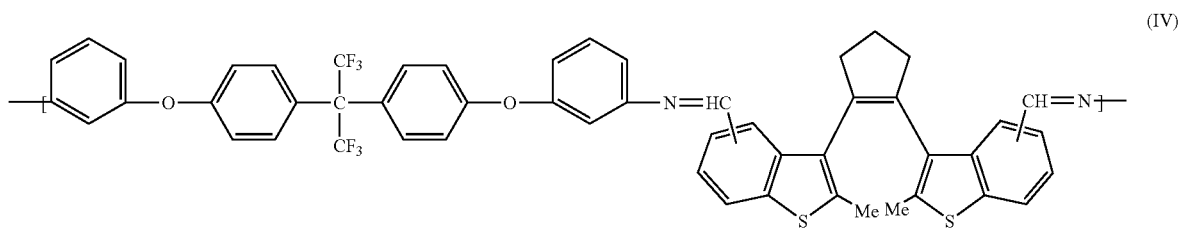

(IV)

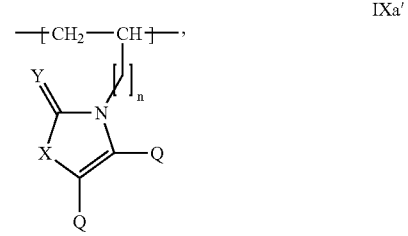

IXa' wherein X is CH2, O, S or N-Alk; Y is O, S, or N-Alk; n is any integer of 0~6; each of the substituents Q is independently selected from below,

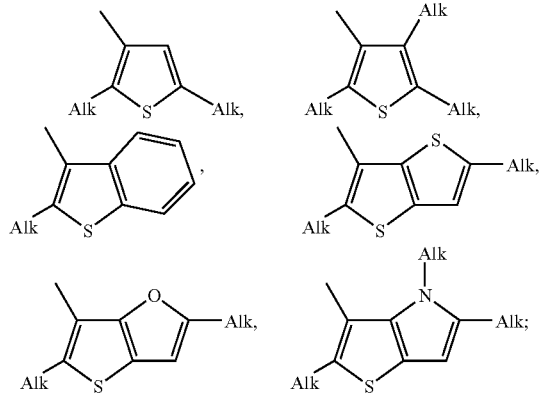

and Alk is a C1-10 alkyl group.

According to an aspect of the invention, the photochromic polymer of the photochromic polymer mixture is a polyester of the chemical formula (IX):

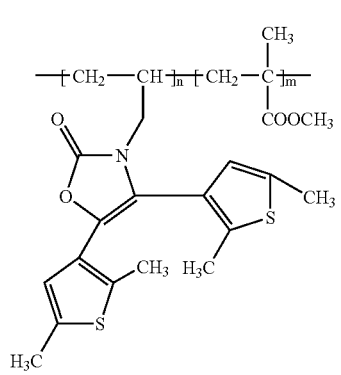

wherein n≠0 and m≠0, and n and m represent relative molar amounts.

According to an aspect of the invention, the photochromic polymer of the photochromic polymer mixture is a copolymer of the chemical formula (IXa):

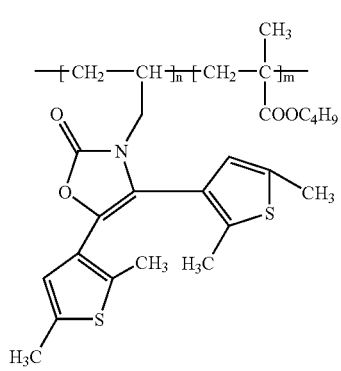

wherein n≠0 and m≠0 and n and m represent relative molar amounts.

According to an aspect of the invention, the photochromic polymer of the photochromic polymer mixture has in a main chain a structural unit of the general formula (III'):

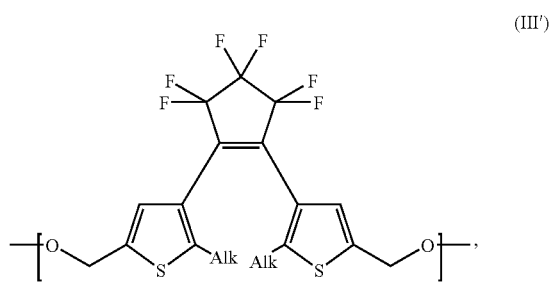

wherein Alk is a C1-10 alkyl group.

According to an aspect of the invention, the photochromic polymer of the photochromic polymer mixture is a polyester of the chemical formula (VII):

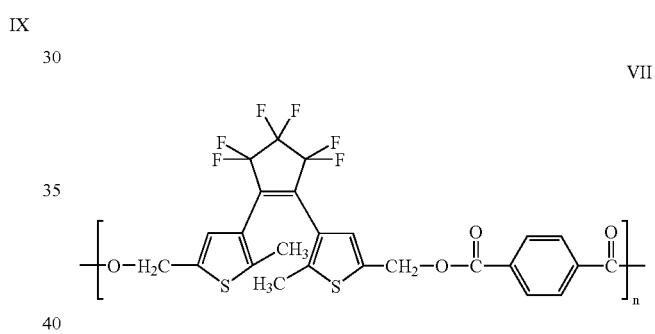

wherein n is a positive integer.

According to an aspect of the invention, the photochromic polymer of the photochromic polymer mixture is a polyester of the chemical formula (VIIa):

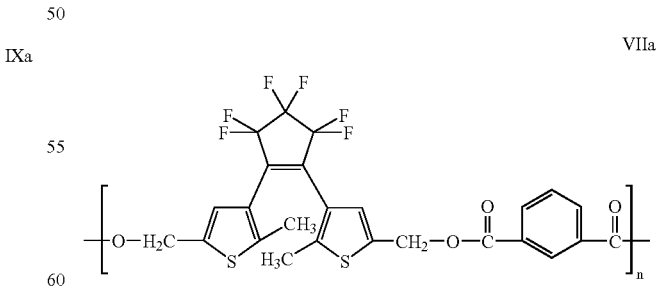

wherein n is a positive integer.

According to an aspect of the invention, the photochromic polymer of the photochromic polymer mixture is a polyester of the chemical formula (VIIb):

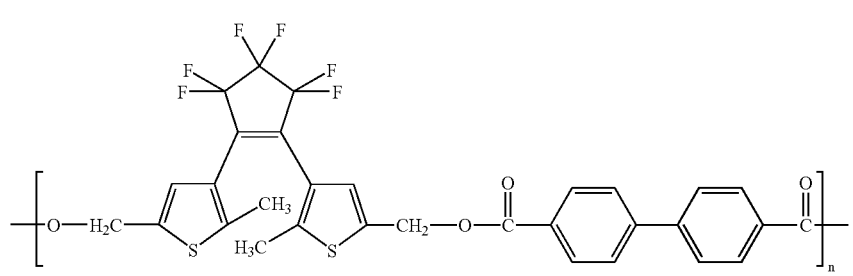

VIIb

According to an aspect of the invention, the photochromic polymer of the photochromic polymer mixture is a polyester of the chemical formula (VIIc):

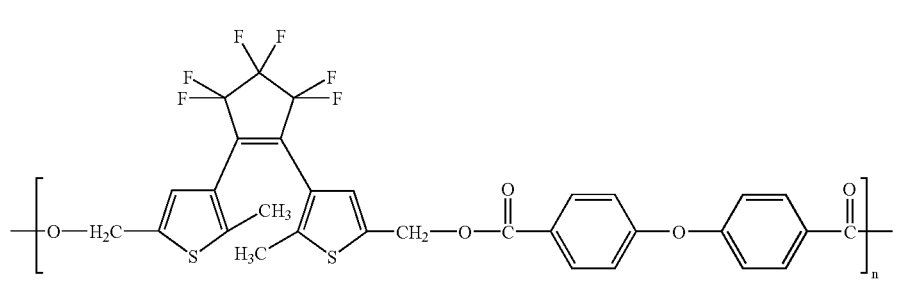

VIIc wherein n is a positive integer.

According to an aspect of the invention, the photochromic polymer of the photochromic polymer mixture is a polyester of the chemical formula (VIId):

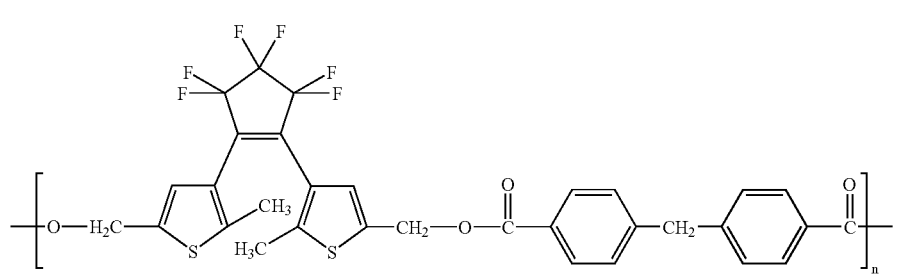

VIId

According to a still another aspect of the present invention, there is provided a photochromic recording medium comprising the photochromic polymer according to an aspect of the present invention or the photochromic polymer mixture according to an aspect of the present invention.

According to a still another aspect of the present invention, there is provided a photoswitch of optical signals comprising the photochromic polymer according to an aspect of the present invention or the photochromic polymer mixture according to an aspect of the present invention.

According to an aspect of the invention, the photochromic polymer based on the photochromic monomer and the photochromic polymer mixture comprising the photochromic polymer have a photochromic property necessary for creating a so-called two-photon photochromic recording medium for a 3D read/write optical memory with bit-by-bit recording of optical information.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become more apparent and more readily appreciated by describing in detail exemplary embodiments thereof with reference to the accompanying drawings in which.

DETAILED DESCRIPTION OF THE EMBODIMENTS

Figure 1:
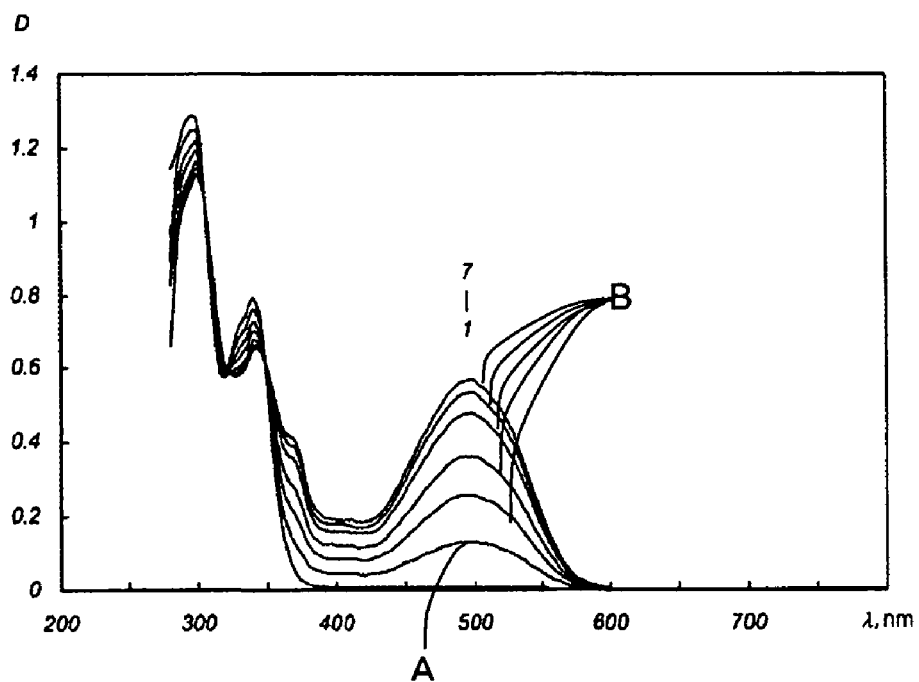
FIG. 1 shows absorption spectra of an initial open form A (curve 1) and a photoinduced form B via a UFS-2 glass light filter (curves 2 to 7) under increasing UV light exposure for the photochromic compound 5 synthesized in Example 1 in a toluene solution ($C=2 \cdot 10^{-4}$ M) according to an aspect of the invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A photochromic monomer, a photochromic polymer based on the same, a photochromic recording medium comprising the photochromic polymers, and a 3D read/write optical memory comprising the recording medium according to embodiments of the present invention will now be described in more detail.

A photochromic monomer according to an embodiment of the present invention is represented as the general formula (I):

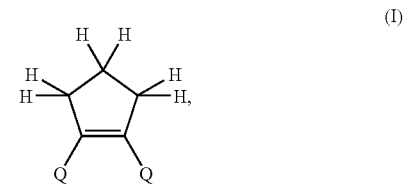

wherein each of the substituents Q is independently selected from below,

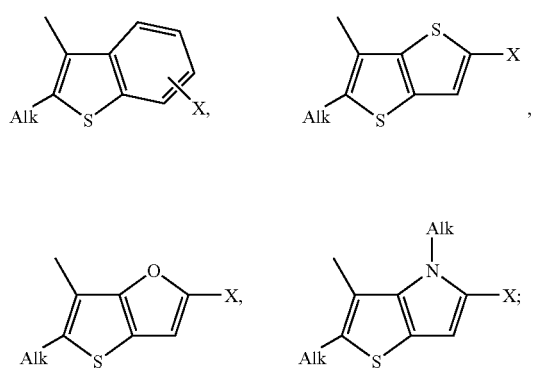

Alk is a C1-10 alkyl group; and X is Cl, Br, I, F, NH2, CH2OH, CH2Cl, CH2Br, CHO, or COOH.

A photochromic monomer according to another embodiment of the present invention is represented as the general formula (II):

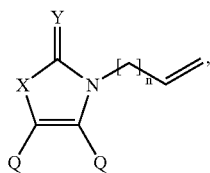

(II)

wherein X is CH2, O, S or N-Alk; Y is O, S, or N-Alk; n is any integer of 0~6; each of the substituents Q is independently selected from below,

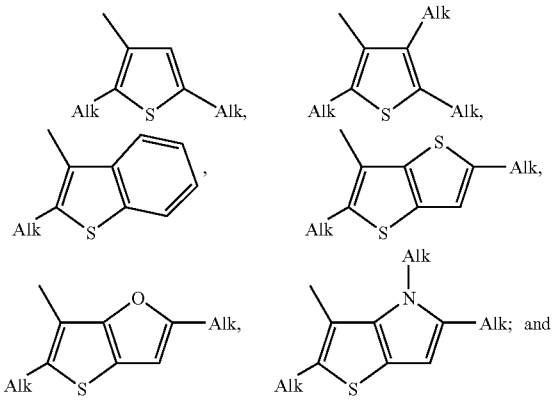

Alk is a C1-10 alkyl group.

A photochromic monomer according to a still another embodiment of the present invention is represented as the general formula (III):

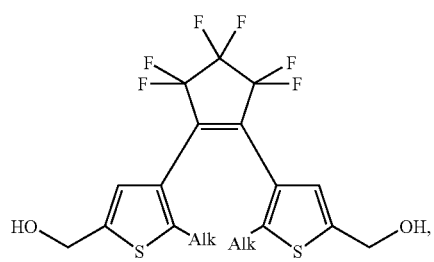

(III)

wherein Alk is a C1-10 alkyl group.

The photochromic polymer according to according to aspects of the present invention is a copolymer or a homopolymer derived from the functional photochromic monomers of dihetaryl ethene types I-III (the general formula I-III). The term "polymer" herein should be understood as including an oligomer having a smaller molecular weight than its corresponding polymer forms.

Specifically, a photochromic polymer according to an embodiment of the present invention is a photochromic polymer having a structural unit in a main chain or as a side chain derived from photochromic monomers of the general formula (I):

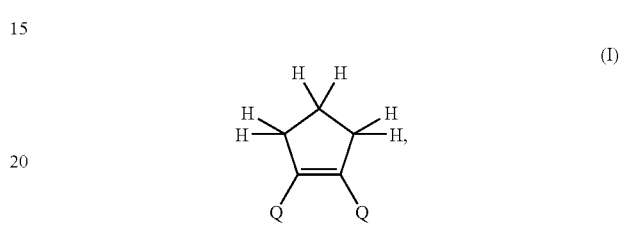

(I)

wherein each of the substituents Q is independently selected from below,

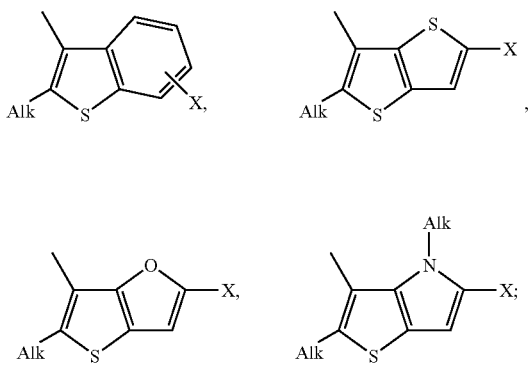

Alk is a C1-10 alkyl group; and X is Cl, Br, I, F. NH2, CH2OH, CH2Cl, CH2Br, CHO, or COOH.

The photochromic polymer may be a copolymer of the chemical formula (IV):

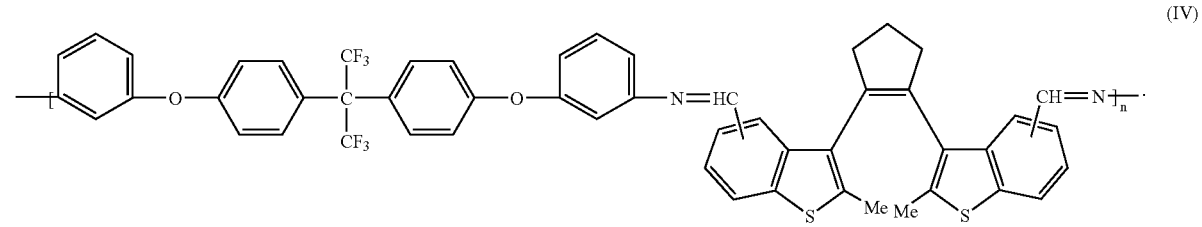

(IV)

A photochromic polymer according to another embodiment of the present invention is a photochromic polymer having in a main chain a structural unit of the general formula (IXa):

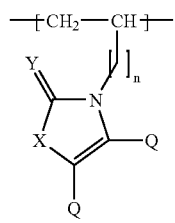
(IXa')

wherein X is CH2, O, S or N-Alk; Y is O, S, or N-Alk; n is any integer of 0~6; each of the substituents Q is independently selected from below,

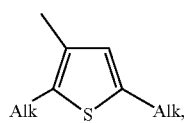 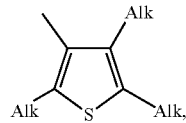

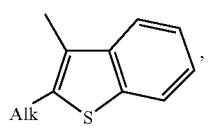 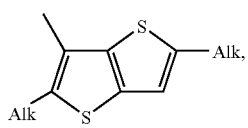

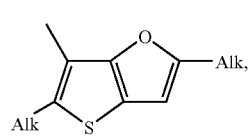 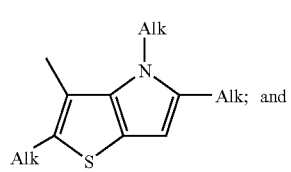 ; and

Alk is a C1-10 alkyl group.

The photochromic polymer (IXa) may be a copolymer of the chemical formula (IX):

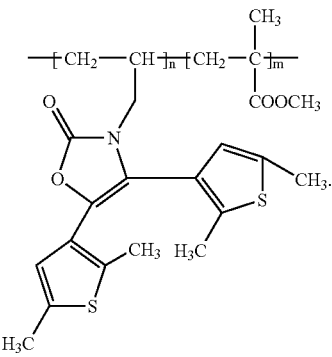
(IX)

n + m = 1

The photochromic polymer (IXa) may be a copolymer of the chemical formula (IXa):

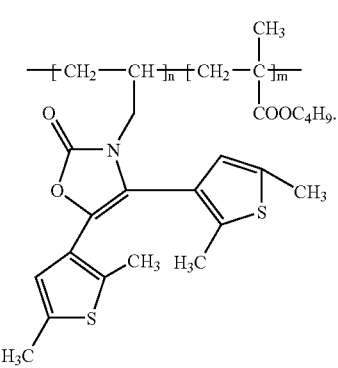
(IXa)

n + m = 1

A photochromic polymer according to a still another embodiment of the present invention is a photochromic polymer having in a main chain a structural unit of the general formula (III'):

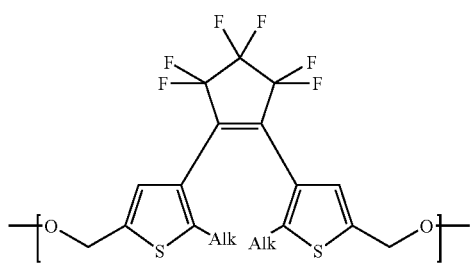
(III')

wherein Alk is a C1-10 alkyl group.

The photochromic polymer (III') may be a polyester of the chemical formula (VII):

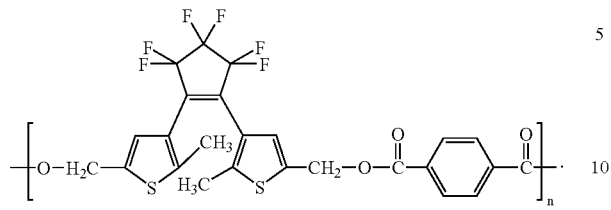
VII
The photochromic polymer (III') may be a polyester of the chemical formula (VIIa):
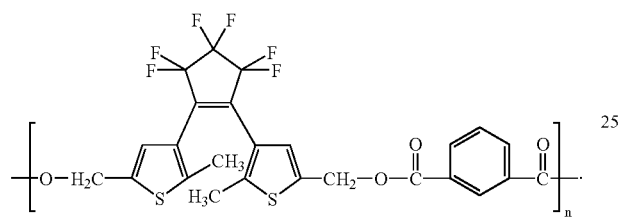
VIIa
The photochromic polymer (III') may be a polyester of the chemical formula (VIIb):
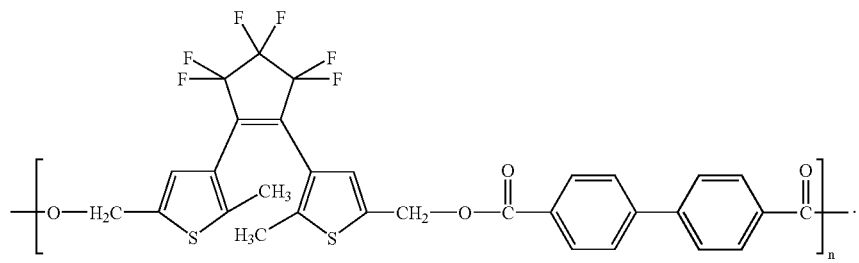
VIIb
The photochromic polymer (III') may be a polyester of the chemical formula (VIIc):
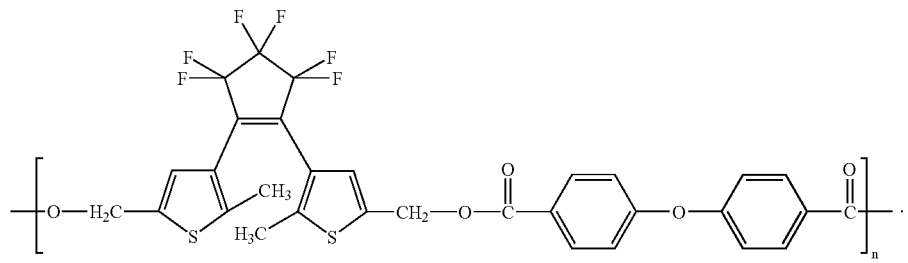
VIIc
The photochromic polymer (III') may be a polyester of the chemical formula (VIId):

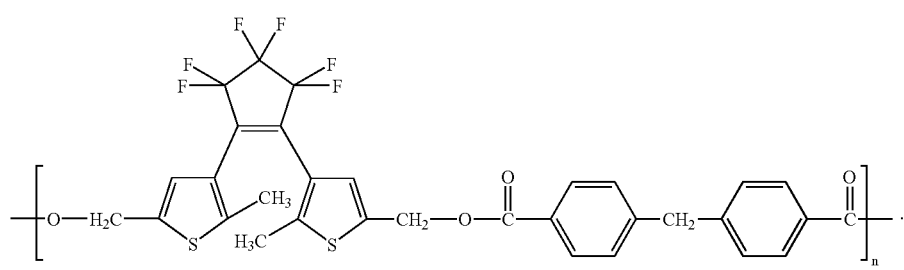

VIId

A photochromic polymer according to aspects of the present invention may be a photochromic polymer mixture comprising 1~99% by weight of a photochromic polymer; and 99~1% by weight of a polymer binder. The photochromic polymer has a structural unit in a main chain or as a side chain derived from photochromic monomers of the general formula (I):

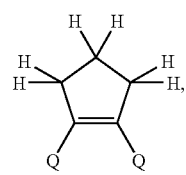

wherein each of the substituents Q is independently selected from

According to an aspect of the invention, the photochromic polymer of the photochromic polymer mixture has in a main chain a structural unit of the general formula (IXa):

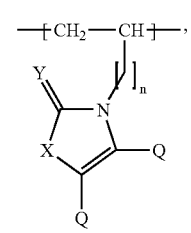

IXa' wherein X is CH2, O, S or N-Alk; Y is O, S, or N-Alk; n is any integer of 0~6; each of the substituents Q is independently selected from below,

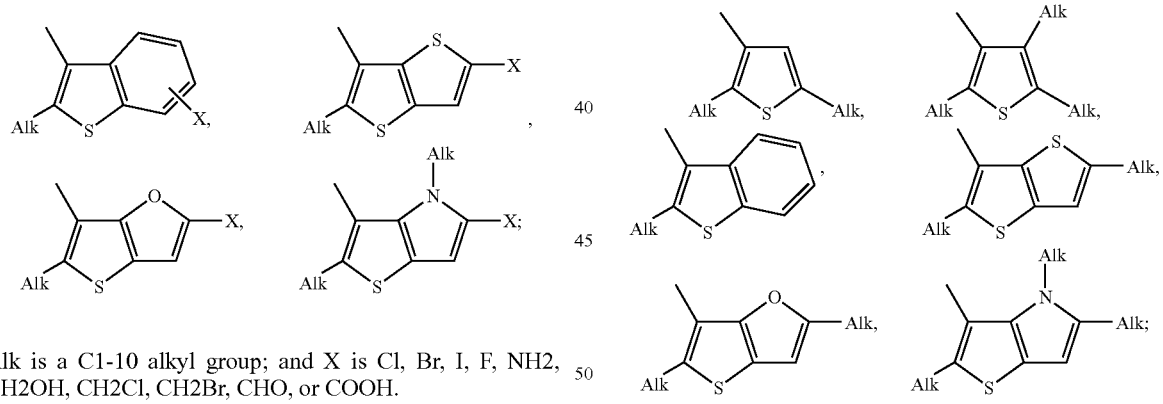

Alk is a C1-10 alkyl group; and X is Cl, Br, I, F, NH2, CH2OH, CH2Cl, CH2Br, CHO, or COOH.

According to an aspect of the invention, the photochromic polymer of the photochromic polymer mixture is a copolymer of the chemical formula (IV):

and Alk is a C1-10 alkyl group.

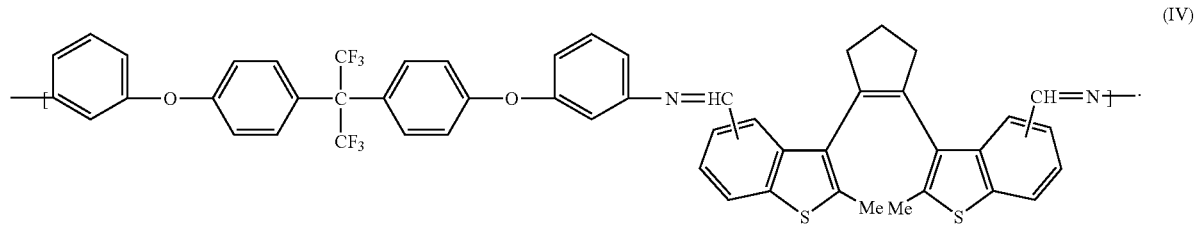

(IV)

According to an aspect of the invention, the photochromic polymer of the photochromic polymer mixture is a copolymer of the chemical formula (IX):

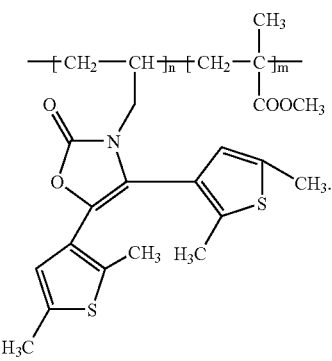

IX n + m = 1

According to an aspect of the invention, the photochromic polymer of the photochromic polymer mixture is a copolymer of the chemical formula (IXa):

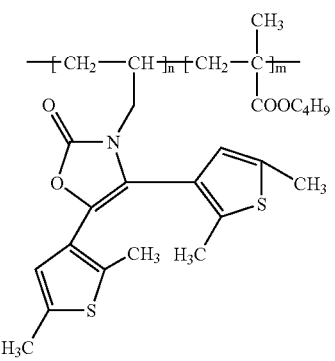

IXa n + m = 1

According to an aspect of the invention, the photochromic polymer of the photochromic polymer mixture has in a main chain a structural unit of the general formula (III'):

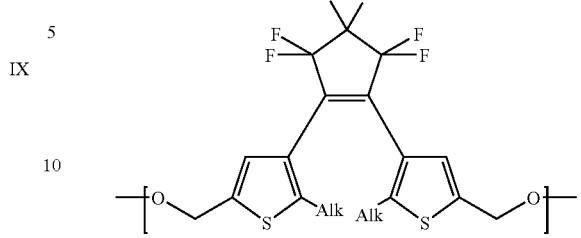

(III')

wherein Alk is a C1-10 alkyl group.

According to an aspect of the invention, the photochromic polymer of the photochromic polymer mixture is a polyester of the chemical formula (VII):

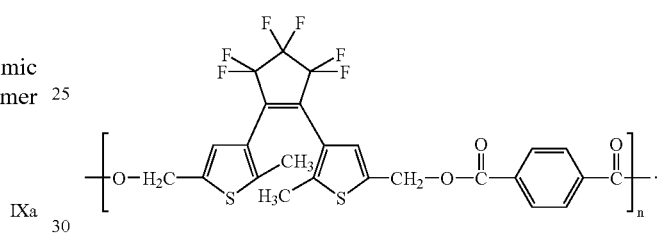

VII

According to an aspect of the invention, the photochromic polymer of the photochromic polymer mixture is a polyester of the chemical formula (VIIa):

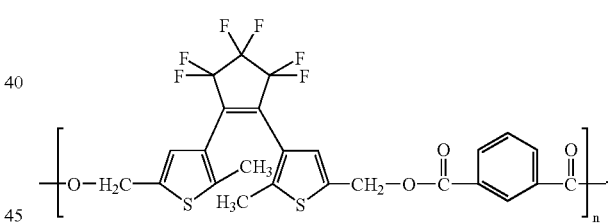

VIIa

According to an aspect of the invention, the photochromic polymer of the photochromic polymer mixture is a polyester of the chemical formula (VIIb):

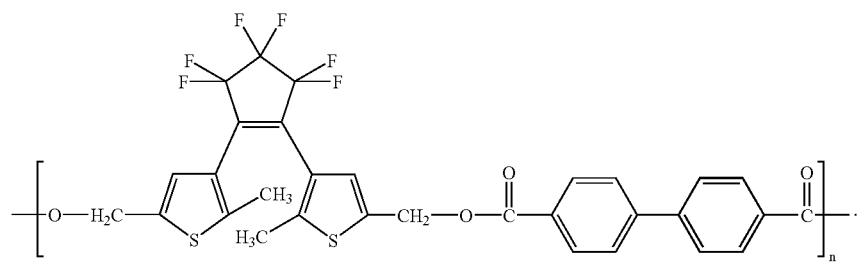

VIIb

According to an aspect of the invention, the photochromic polymer of the photochromic polymer mixture is a polyester of the chemical formula (VIIc):

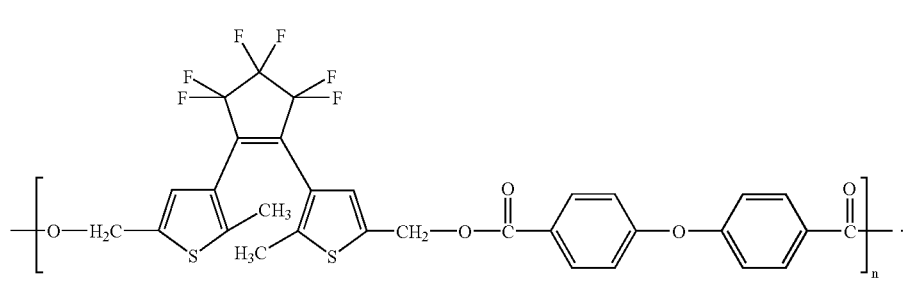

VIIc

According to an aspect of the invention, the photochromic polymer of the photochromic polymer mixture is a polyester of the chemical formula (VIId):

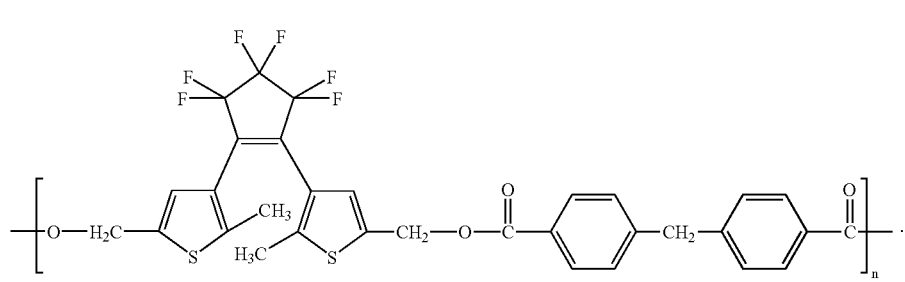

VIId

The photochromic polymer may be used alone or in a combination of two or more. If the amount of the photochromic polymer is less than 1 wt %, then the density of the photochrome unit within the material becomes too low. This translates into a lesser amount of information expressed or stored unit volume or surface. While not required in all aspects, the amount of the photochromic polymer is preferably 3-97 wt %, and the amount of the polymer binder is preferably 97-3 wt %. While not required in all aspects, the amount of the photochromic polymer is more preferably 5-95 wt %, and the amount of the polymer binder is more preferably 95-5 wt %. Still more preferably and while not required in all aspects, the amount of the photochromic polymer is 10-90 wt %, and the amount of the polymer binder is 90-10 wt %.

The polymer binder may include, but are not limited to, vinyl-based polymers, polymers of an ethylenically unsaturated monomer, acrylics polymers, polyesters, polycarbonates, polyimides and polyamides according to aspects of the invention. The polymer binder may be used alone or in combinations of two or more according to aspects of the invention.

The photochromic polymer and the photochromic polymer mixture may be used as a photochromic recording medium, for example as a two-photon photochromic recording medium capable of bit-by-bit recording of optical information according to an aspect of the invention. The photochromic recording medium may be used as a 3D read/write optical memory for use in a recording and/or reproducing apparatus such as that shown in FIG. 14.

The photochromic polymer and the photochromic polymer mixture may also be used as a photoswitch of optical signals.

The photochromic dihetaryl ethene type monomers expressed as the general formula I-III and the photochromic polymer based on the monomers according to the present invention have different chemical structures from those disclosed in U.S. Patent Publication No. 2004/0030078. Specifically, the photochromic monomers and the photochromic polymers based on the monomers are novel in that the dihetaryl ethene type unit of the general formula I-III is used as a photochromic fragment or a photochromic moiety. The photochromic polymers and the photochromic polymer mixture of the present invention exhibit a thermal irreversibility of the photochromic transformations and other properties which enable the use of the photochromic polymers for creating a two-photon photochromic recording medium for a 3D read/write optical memory with bit-by-bit recording of optical information. That is to say, the use of the photochromic polymers and the photochromic polymer mixture of aspects of the present invention enables a two-photon optical information recording in a 3D read/write optical memory devices.

Photochromism of diaryl ethenes (DAE) like the photochromic dihetaryl ethene type monomers expressed as the general formula I-III undergoes a reversible photocyclization (i.e. a photoinduced transformation) from an open form A to a cyclic form B according to the reaction scheme indicated below:

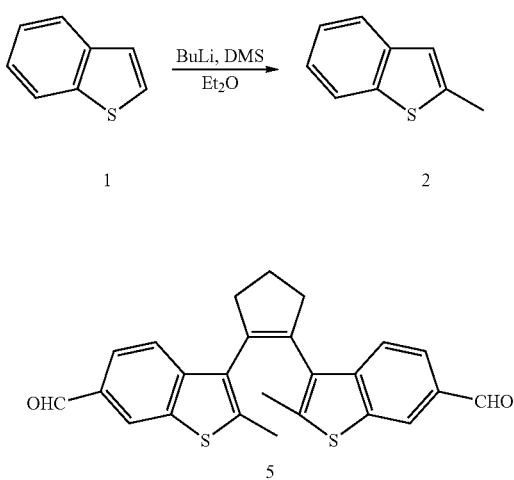

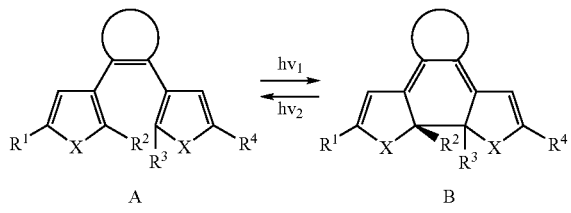

In the above reaction scheme, each of $R_1$, $R_2$, $R_3$ and $R_4$ is a hydrogen atom, a substituted or unsubstituted $C_1$-$C_{10}$ alkyl group, a five- or six-membered, fused complex ring having at least one hetero atom selected from among N, S, and O, or a fused $C_6$-$C_{10}$ aryl group; and X is S, O, NH, or NR where R is a $C_1$-$C_{10}$ alkyl group.

The photochromic dihetaryl ethene type monomers expressed as the general formula I-III and the photochromic polymer based on the monomers according to the present invention offer many advantages. For example, they possess optimal photochromic properties, including thermal irreversibility and fatigue resistance. In addition, the wavelength of light expressed in the colored forms B can be readily tuned by tailoring the electronic distribution in the conjugated pathway created upon cyclization. This is most conveniently accomplished by modifying pendant functional groups $R_1$, $R_2$, $R_3$ and $R_4$, especially $R_1$, and $R_4$, located on the heterocycles as shown above in the reaction scheme that illustrates the photoinduced interconversion between the colorless-open form A and colored-closed form B, but can be otherwise accomplished.

Hereinafter, aspects of the present invention will be described in more detail with reference to the following examples. However, these examples are given for the purpose of illustration and are not intended to limit the scope of the invention.

EXAMPLES

Example 1

A photochromic 1,2-bis(2-methyl-6-formyl-1-benzothiophen-3-yl)cyclopentene monomer 5 of the type I was synthesized according to the scheme shown below:

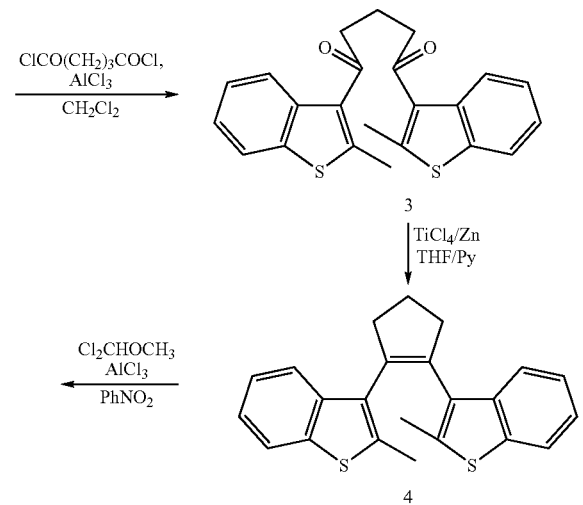

The method is characterized in that a compound 4 was produced at a yield of 60% by cyclization of diketone 3 under effect of $TiCl_4$ and Zn in THF (tetrahydrofurane) in the presence of pyridine. In contrast, existing literature reports about production of a compound 4 by cyclization of the diketone 3 under effect of $TiCl_4$, Zn in THF is a yield of 54% (Synthesis 1998, pp. 1092-1094).

Synthesis of
1,2-bis(2-methyl-1-benzothiophen-3-yl)cyclopentene 4

$TiCl_4$ (2.8 ml) was added dropwise to a vigorously stirred suspension of 3.33 g of zinc in freshly distilled anhydrous THF (50 ml) at −10° C. under argon. Upon the addition, the reaction mixture was heated under argon for 1 hour. The mixture was then cooled down to 20° C. and 5.0 g of diketone 3 and anhydrous pyridine (5 ml) were added thereto. The mixture was boiled more for 20 hours. Then, the mixture was poured into a 10% $K_2CO_3$ solution (150 ml) and the aqueous layer was extracted by $Et_2O$ (5×100 ml). The collected organic extracts were dried by magnesium sulfate $MgSO_4$ and were distilled under vacuum. The remainder was purified by the flash chromatography on silica gel (Merck, 0.063-0.1) with a petroleum ether (40/70)-AcOEt (10:1 by volume) being used as an eluent. The yield was 2.76 g of the product 4 (60%) having a melting point $T_{melt}$=186.5-187.5° C., while the literature reports of $T_{melt}$=187-188° C. (Synthesis 1998, pp. 1092-1094).

Synthesis of 1,2-bis(2-methyl-6-formyl-1-benzothiophen-3-yl)cyclopentene 5

Dichloromethyl ether (4.52 ml, 50 mmol) and anhydrous aluminum chloride (1.78 g, 13.35 mmol) were added to a stirred solution of 1,2-bis(2-methyl-1-benzothiophen-3-yl) cyclopentene 4 (1.2 g, 3.33 mmol) in nitrobenzene (25 ml) at 0° C., and the mixture was stirred for 30 min at 0° C. and for 20 hours at room temperature. The reaction mixture was poured into icy water, and the product was extracted by ethyl acetate, was washed with water and was dried by magnesium sulfate. After distillation of nitrobenzene under vacuum, the product was purified by the column chromatography (Silica Gel, 0.063-0.1) with a petroleum ether (40/70):ethyl acetate mixture (6:1 by volume) being used as an eluent. The yield was 0.56 g of dialdehyde 5 (40%), $T_{melt}$=196-197° C. (hexane:chloroform, 6:1 by volume). Mass spectrum, m/z: 416, [M]$^+$. A $^1$H NMR spectrum (DMSO-d$_6$, δ, ppm, J/Hz): 2.25 (m, 6H, 2×CH$_3$), 2.97 (br m, 6H, 3×CH$_2$), 7.6-8.5 (br m, 6H, CH$_{arom.}$), 9.98 (br m, 2H, 2×CHO). The results found (%): C, 72.16; H, 4.86; S, 15.34. $C_{25}H_{20}O_2S_2$. The results calculated (%): C, 72.08; H, 4.84; S, 15.40.

FIG. 1 shows absorption spectra of an initial open form A (curve 1) and a photoinduced form B via a UFS-2 glass light filter (curves 2 to 7) under increasing UV light exposure for the photochromic compound 5 synthesized in Example 1 in a toluene solution (C=2·10$^{-4}$ M). In the FIG. 1 and subsequent FIGs, "D" denotes an optical density and t.s denotes time in seconds. Curve 1 is an absorption spectrum of the form A of the thus-prepared compound 5 in toluene at a concentration C=2·10$^{-4}$ M measured by the Cary 50 (Varian) spectrophotometer immediately after the dissolution. Curves 2-7 are absorption spectra of the form B after exposure to UV light of a DRS-250 mercury lamp via a UFS-2 glass filter from the standard set of glass optical filters.

Figure 2:
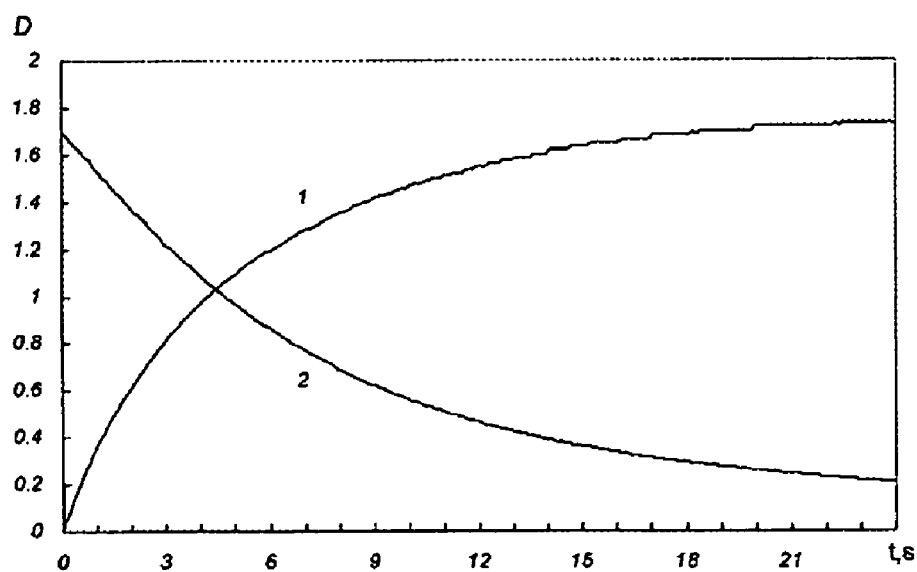
FIG. 2 shows kinetic curves of photocoloration by UV light via a UFS-6 filter (curve 1) and photobleaching by visible light via a ZS-12 light filter (curve 2) for a solution of the photochromic compound 5 in toluene at the wavelength of the maximum in the absorption band of the cyclic form B according to an aspect of the invention.

FIG. 2 shows kinetic curves of photocoloration by UV light via a UFS-6 filter (curve 1) and photobleaching by visible light via a ZS-1 2 light filter (curve 2) for a solution of the photochromic compound 5 in toluene at the wavelength of the maximum in the absorption band of the cyclic form B. Curve 1 is an optical density variation (kinetics) of the solution measured at the maximum of the absorption band of the cyclic form B under effect of the same UV light (the photocoloration process). Curve 2 is an optical density variation (kinetics) of the solution measured after the equilibrium state is achieved, under effect of visible light of the same light source passed via a ZS-12 glass light filter (the photobleaching process).

From the spectral and kinetic data, it would be obvious that the compound exhibited photochromic properties suitable for practical applications.

Example 2

A photochromic 3-allyl-4,5-bis-(2,5-dimethyl-3-thienyl)-1,3-oxazole-2-one monomer 8 of the type 11 was prepared according to the scheme shown below:

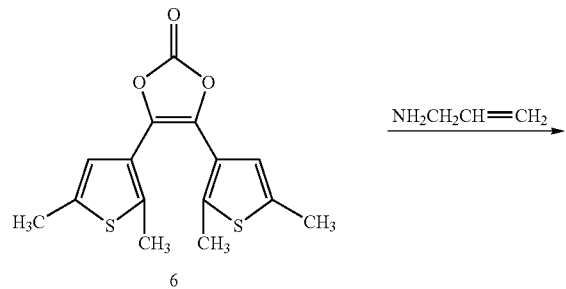

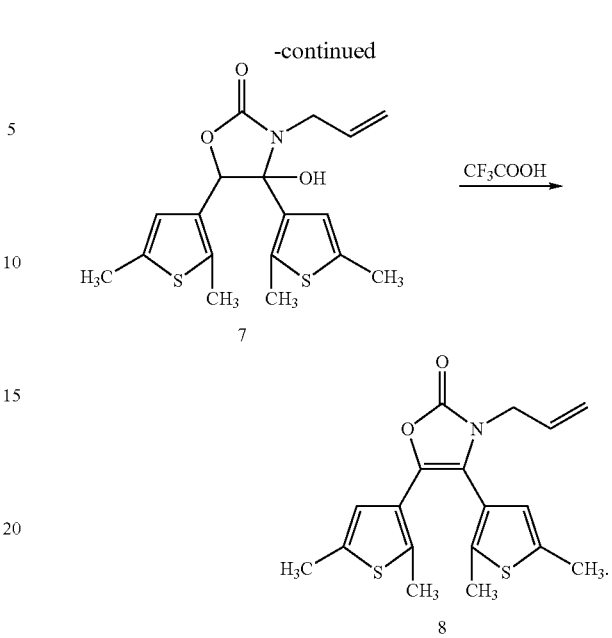

Synthesis of 3-allyl-4,5-bis-(2,5-dimethyl-3-thienyl)-4-hydroxy-1,3-oxazolane-2-one 7

Allylamine (0.3 g, 5.00 mmol) was added to a solution of carbonate 6 (1.0 g, 3.27 mmol) in 10 ml of ethanol and the mixture was stirred at ~25° C. for 1-1.5 hours. A precipitate was filtered out, and the product was crystallized from ethanol. The yield was 1,1 g (93%) of oxazolane 7, $T_{melt}$=181-182° C. The results found (%): C, 59.54; H, 5.71; S, 17.55. $C_{18}H_{21}NO_3S_2$. The results calculated (%): C, 59.48; H, 5.82; S, 17.64. $^1$H NMR spectrum (DMSO-d$_6$, δ, ppm): 1.79 (s, 3H, CH$_3$); 2.13 (s, 3H, CH$_3$); 2.29 (s, 3H, CH$_3$); 2.36 (s, 3H, CH$_3$); 3.65 (d, 2H, CH$_2$, J=6 Hz); 5.05 (d, 1H, CH, J=10 Hz); 5.11 (d, 1H, CH, J=17 Hz); 5.35 (s, 1H, CH); 5.83 (m,1 H, CH); 6.42 (s,1 H, OH); 6.61 (s,1 H, CH); 6.80 (s,1 H, CH).

Synthesis of 3-allyl-4,5-bis-(2,5-dimethyl-3-thienyl)-1,3-oxazole-2-one 8

A solution of 0.9 g (2.5 mmol) of 1,3-oxazolane-2-one 7 in 25 ml (0.325 mol) of CF$_3$COOH was stirred at ~25° C. for 3-3.5 hours. The solvent was evaporated under vacuum and the residue was crystallized from ethanol. The yield was 0.63 g of oxazole 8 (73%), $T_{melt}$=103-104° C. The results found (%): C, 62.43; H, 5.62; S, 18.78. $C_{18}H_{19}NO_2S_2$. The results calculated (%): C, 62.58; H, 5.54; S, 18.56. $^1$H NMR spectrum (DMSO-d$_6$, δ, ppm): 1.99 (s, 3H, CH$_3$); 2.12 (s, 3H, CH$_3$); 2.27 (s, 3H, CH$_3$); 2.32 (s, 3H, CH$_3$); 4.03 (d, 2H, CH$_2$, J=6 Hz); 4.93 (d, 1H, CH, J=17 Hz); 5.09 (d, 1H, CH, J=10 Hz); 5.73 (m, 1H, CH); 6.37 (s, 1H, CH); 6.74 (s, 1H, CH).

Figure 3:
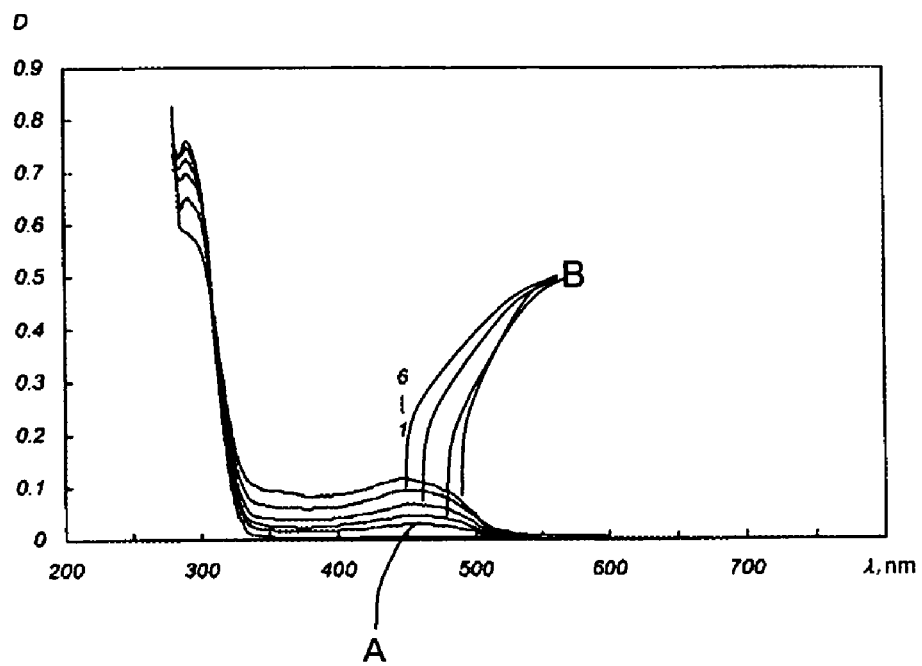
FIG. 3 shows absorption spectra of an initial open form A (curve 1) and a photoinduced form B under increasing UV light exposure via a UFS-2 light filter (curves 2 to 6) for the photochromic compound 8 from the group II synthesized in Example 2 in toluene according to an aspect of the invention.
Figure 4:
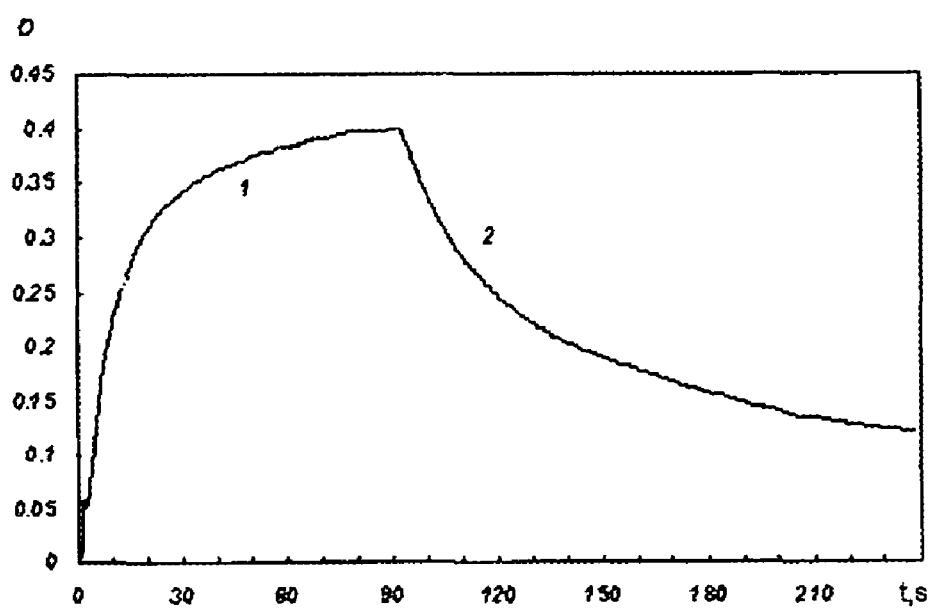
FIG. 4 shows kinetic curves of photocoloration by UV light via a UFS-2 glass light filter (curve 1) and photobleaching by visible light via a ZS-12 light filter (curve 2) for a solution of the photochromic compound 8 from group II in toluene at the wavelength of the maximum in the absorption band of the cyclic form B according to an aspect of the invention.

FIG. 3 shows absorption spectra of an initial open form A (curve 1) and a photoinduced form B under increasing UV light exposure via a UFS-2 light filter (curves 2 to 6) for the photochromic compound 8 from the group II in toluene. FIG. 4 shows kinetic curves of photocoloration by UV light via a UFS-2 glass light filter (curve 1) and photobleaching by visible light via a ZS-12 light filter (curve 2) for a solution of the photochromic compound 8 from group II in toluene at the wavelength of the maximum in the absorption band of the cyclic form B.

The spectral (FIG. 3) and kinetic (FIG. 4) characteristics measured using the method described in Example 1 demonstrate that the photochromic properties of the photochromic monomer 8 were suitable for practical applications.

Example 3

A photochromic 1,2-bis(5-hydroxymethyl-2-methylthien-3-yl)hexafluoropentene monomer 12 was synthesized according to the scheme shown below:

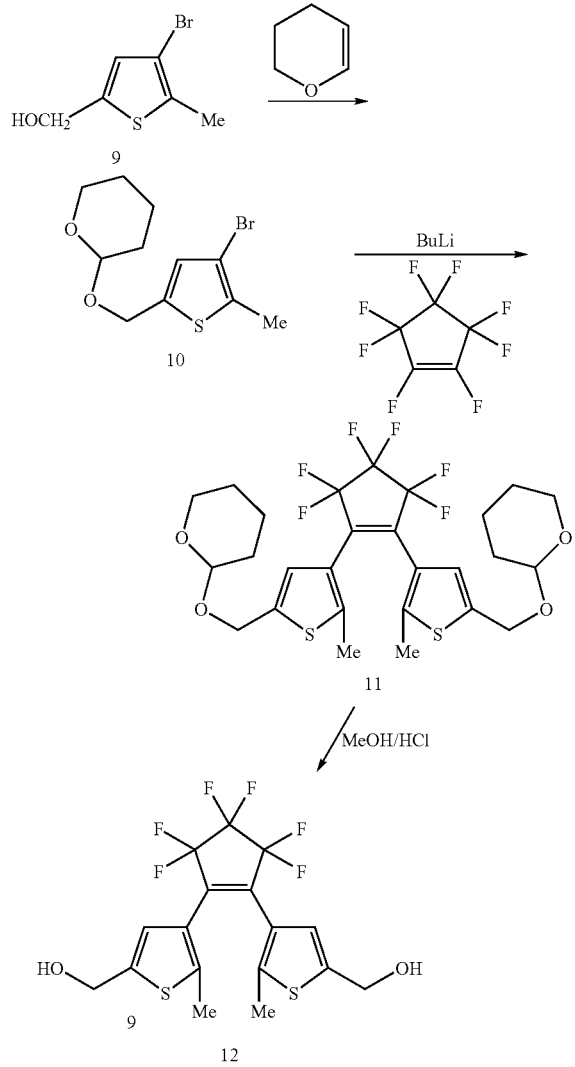

This method is characterized in that a more available 1,2-dihydropyrane was used as a protecting group in the synthesis of 1,2-bis(5-hydroxymethyl-2-methylthiophen-3-yl) hexafluoropentene 12. In contrast, existing literature reports of the use of hardly available tert-butyldimethylsilyl protection (Chem. Letters 1998, pp. 1093-1094).

Synthesis of 2-[(4-bromo-5-methylthiophen-2-yl) methoxy]tetrahydro-2H-pyrane 10

2.6 ml of 1,2-dihydropyrane and 0.2 g of p-toluene sulfonic acid were added to 5.4 g of 4-bromo-2 hydroxymethyl-5-methylthiophene 9 in 40 ml of methanol. The reaction mixture was stirred at room temperature for 24 hours. Methanol was distilled under vacuum and the remainder was distilled by an oil pump. The yield was 6.82 g of the product 10 (90%), $T_{melt}$=125-130° C. (5 mm Hg), $n_d^{165}$=1.5610. Mass-spectrum, m/z: 291, [M]$^+$. $^1$H NMR spectrum (CDCl$_3$, δ, ppm, J/Hz): 1.45-1.95 (m, 6H, 3×CH$_2$), 2.37 (s, 3H, CH$_3$), 3.50-3.65 (m, 1H, CH), 3.80-4.0 (m, 1 H), 4.55-4.85 (m, 3H), 6.82 (s, 1 H, CH). The results found (%): C, 45.43; H, 5.20; S, 10.92. $C_{11}H_{15}BrO_2S$. The results calculated (%): C, 45.37; H, 5.19; S, 11.01.

Synthesis of 1,2-bis{5-methoxy-(tetrahydro-2H-pyryl-2)-2-methylthien-3-yl}hexafluoropentene 11

14 ml of a 1.6 M solution of butyllithium in hexane was added to 5.3 g of 2-[(4-bromo-5-methylthiophen-2-yl)methoxy]tetrahydro-2H-pyrane in 30 ml of anhydrous THF at −78° C. under argon, the reaction mixture was stirred at −78° C. for 10 minutes and 1.93 g of octafluorocyclopentene was poured therein. The reaction mixture was held at −78° C. for 1 hour and was kept overnight at room temperature. Then, the mixture was poured into water, was extracted by an ether, and was dried by magnesium sulfate. The solvent was distilled under vacuum, and the resulting oil was chromatographed. The yield was 3.37 g of the oily product 11 (62%). Mass-spectrum, m/z: 596, [M]$^+$. $^1$H NMR spectrum (CDCl$_3$, δ, ppm, J/Hz): 1.45-2.0 (m, 18H, 6×CH$_2$, 2×CH$_3$), 3.45-3.60 (m, 2H, 2×CH), 3.80-3.95 (m, 2H, 2×CH), 4.60-4.85 (m, 6H), 6.93 (s, 2H, CH). The results found (%): C, 54.42; H, 5.08; S, 10.62. $C_{27}H_{30}F_6O_4S_2$. The results calculated (%): C, 54.35; H, 5.07; S, 10.75.

Synthesis of 1,2-bis(5-hydroxymethyl-2-metylthien-3-yl)hexafluoropentene 12

3 ml of concentrated hydrochloric acid was added to 3 g of 1,2-bis{5-methoxy-(tetrahydro-2H-pyryl-2)-2-methylthien-3-yl}hexafluoropentene 11 in 30 ml of methanol. The reaction mixture was stirred at room temperature for 20 hours. Methanol surplus was distilled under vacuum, and the remainder was recrystallized from hexane. The yield was 1.62 g of the product 12 (75%), $T_{melt}$=129-133° C. (against $T_{melt}$=125-128° C. reported in the literature). Mass-spectrum, m/z: 428, [M]$^+$. $^1$H NMR spectrum (CDCl$_3$, δ, ppm, J/Hz): 1.83 (s, 2H, 2×OH), 1.89 (s, 6H, 2×CH$_3$), 4.75 (s, 4H, 2×CH$_2$), 6.94 (s, 2H, CH). The results found (%): C, 47.72; H, 3.30; S, 14.02. $C_{17}H_{14}F_6O_2S_2$. The results calculated (%): C, 47.66; H, 3.29; S, 14.97.

Figure 5:
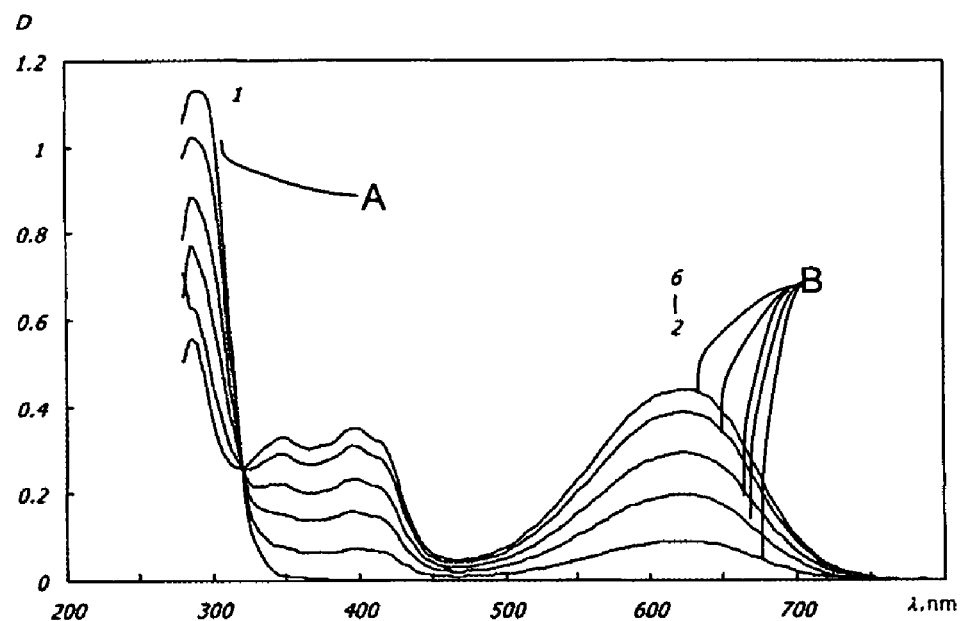
FIG. 5 shows absorption spectra of an initial open form A (curve 1) and a photoinduced form B under increasing UV light exposure via a UFS-2 light filter (curves 2 to 6) for the photochromic compound 12 from the group III in toluene according to an aspect of the invention.
Figure 6:
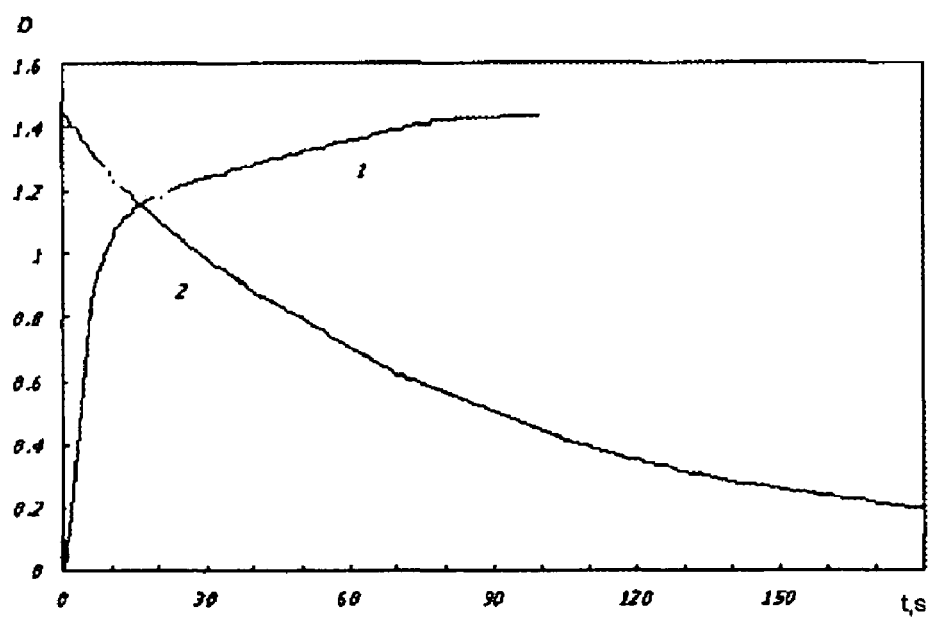
FIG. 6 shows kinetic curves of photocoloration by UV light via a UFS-2 glass filter (curve 1) and photobleaching by visible light via a ZS-12 light filter (curve 2) for a solution of the photochromic compound 12 from the group III in toluene at the wavelength of the maximum in the absorption band of the cyclic form B according to an aspect of the invention.

FIG. 5 shows absorption spectra of an initial open form A (curve 1) and a photoinduced form B under increasing UV light exposure via a UFS-2 light filter (curves 2 to 6) for the photochromic compound 12 from the group III in toluene. FIG. 6 shows kinetic curves of photocoloration by UV light via a UFS-2 glass filter (curve 1) and photobleaching by visible light via a ZS-12 light filter (curve 2) for a solution of the photochromic compound 12 from the group III in toluene at the wavelength of the maximum in the absorption band of the cyclic form B. The spectral (FIG. 5) and kinetic (FIG. 6) characteristics measured using the method described in Example 1 demonstrate that the photochromic properties of the photochromic monomer 12 were suitable for practical applications.

Example 4

Photochromic oligomer IV, a Schiff base, was prepared according to the scheme shown below:

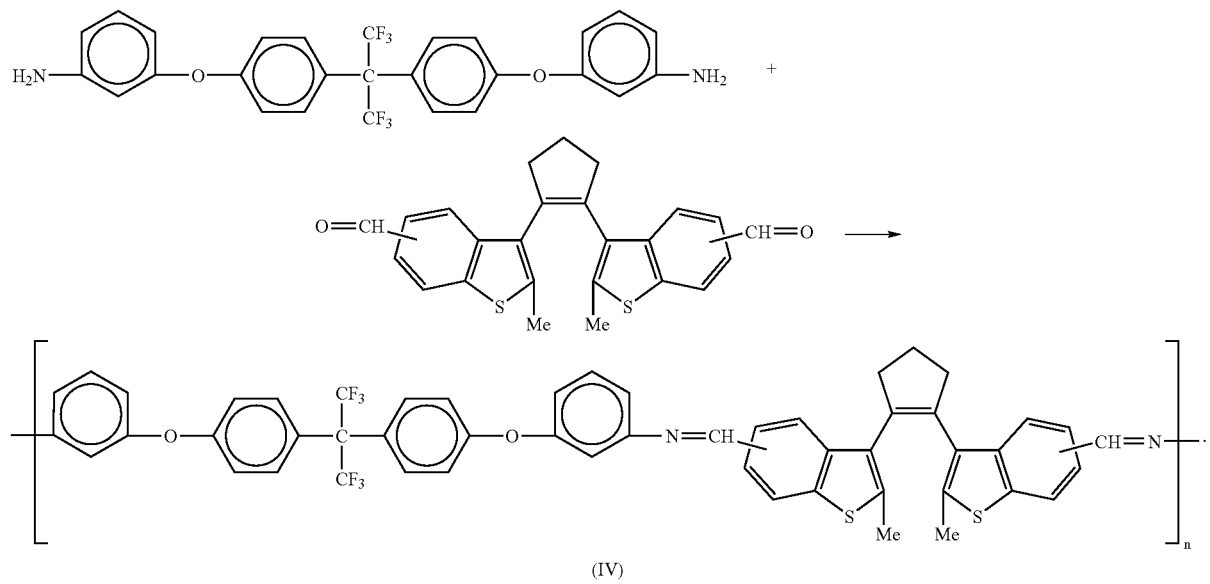

(IV)

103.7 mg (0.2 mmol) of 2,2-bis[4-(3-aminophenoxy)phenyl]hexafluoropropane, 83.3 mg (0.2 mmol) of 3-[2-(formyl-2-methyl-1-benzothiophen-3-yl)-1-cyclopentenyl]-2-methyl-1-benzothiophene-6-carboxaldehyde, 2 ml of DMF and 2 ml of toluene were put into a flask provided with an argon inlet/outlet system, a Dean-Stark trap, a dropping funnel, a magnetic stirrer, and a backflow condenser. The flask was heated up to 140° C. while being stirred in a strong argon flow. The reaction mixture was kept at this temperature for 4 hours with periodic dropwise addition of a 2 ml total amount of toluene; as the result, toluene azeotrope was condensed with water in the Dean-Stark trap. Then the oligomer was precipitated with ethanol, was filtered by a Schott filter, was washed with ethanol, and was dried. The yield was 0.14 g (70%).

A sample of photochromic polymer was prepared by joint dissolution of the prepared oligomer and polymethyl methacrylate (10 wt. % of dry polymer weight) in chloroform. Then, spectral and kinetic characteristics of the produced sample were measured using the method described in Example 1.

Figure 7:
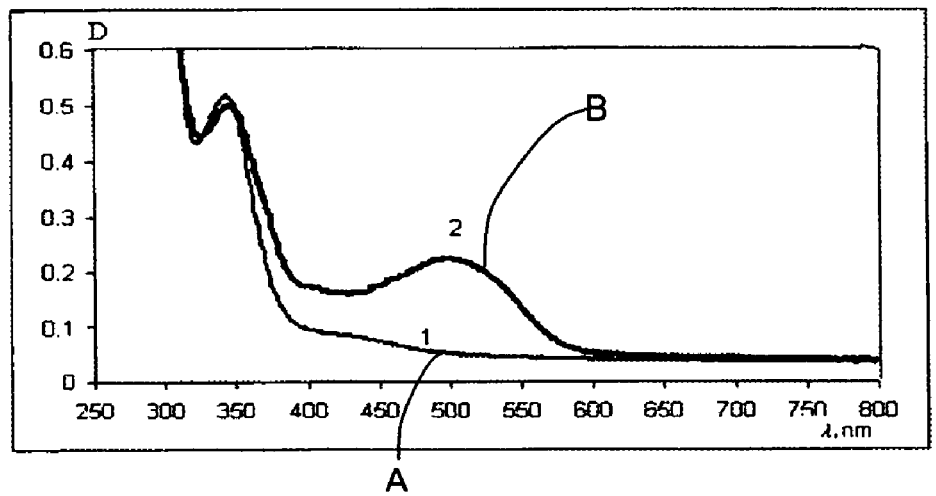
FIG. 7 shows absorption spectra of an initial open form A (curve 1) and a photoinduced form B (curve 2) for a film of the photochromic oligomer IV synthesized in Example 4 in polymethyl methacrylate (10 wt. % of dry polymer weight) before and after exposure to UV light, respectively according to an aspect of the invention.
Figure 8:
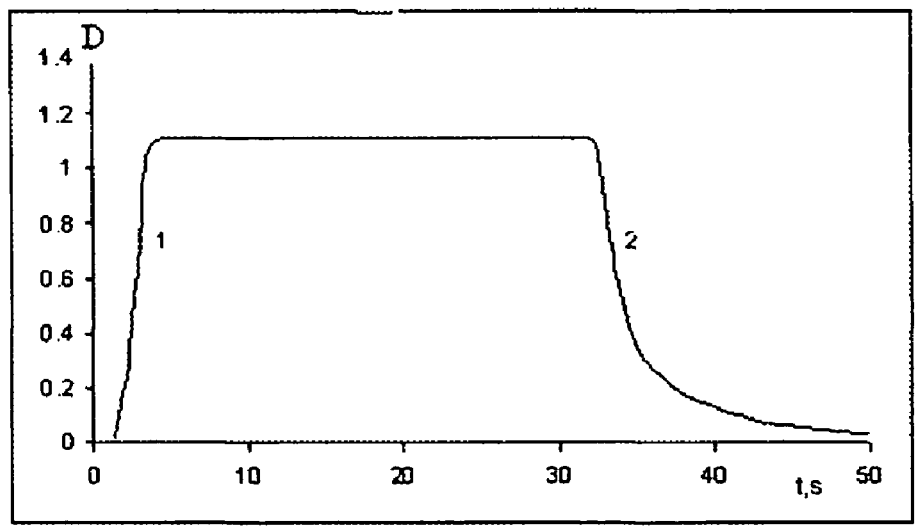
FIG. 8 shows kinetic curves of photocoloration by UV light (curve 1) and photobleaching by visible light (curve 2) for a film of the photochromic oligomer IV in polymethyl methacrylate (10 wt. % of dry polymer weight) at the wavelength of the maximum in the absorption band of the cyclic form B according to an aspect of the invention.

FIG. 7 shows absorption spectra of an initial open form A (curve 1) and a photoinduced form B (curve 2) for a film of the photochromic oligomer IV in polymethyl methacrylate (10 wt. % of dry polymer weight) before and after exposure to UV light, respectively. FIG. 8 shows kinetic curves of photocoloration by UV light (curve 1) and photobleaching by visible light (curve 2) of a film of the photochromic oligomer IV in polymethyl methacrylate (10 wt. % of dry polymer weight) at the wavelength of the maximum in the absorption band of the cyclic form B.

Figure 9:
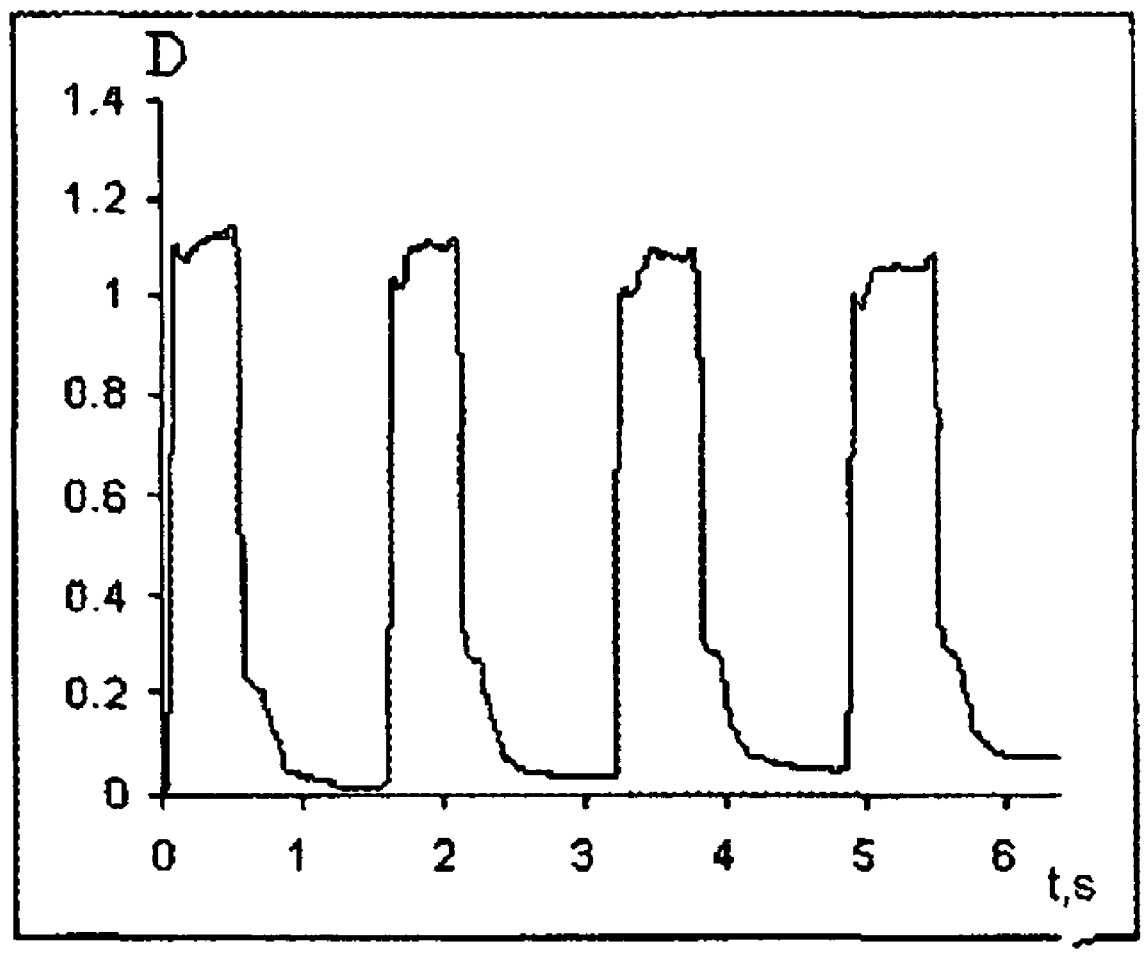
FIG. 9 shows curves for successive photobleaching and photocoloration at periodical replacement of the UFS-8 and PS-7+ZS-18 filters for a film of the photochromic oligomer IV in polymethyl methacrylate (10 wt. % of dry polymer weight) at the wavelength of the maximum in the absorption band of the cyclic form B according to an aspect of the invention.

FIG. 9 shows curves for successive photobleaching and photocoloration at periodical replacement of the UFS-8 and PS-7 +ZS-18 filters for a film of the photochromic oligomer IV in polymethyl methacrylate (10 wt. % of dry polymer weight) at the wavelength of the maximum in the absorption band of the cyclic form B. That is, FIG. 9 represents the cyclicity of photocoloration by UV light via a UFS-8 light filter and photobleaching via the combination of two light filters, i.e. PS-7 and ZS-18 (the filter being periodically replaced). FIG. 9 shows that photochromic polymer exhibits high cyclicity without loss in photochromic properties.

The spectral (FIG. 8) and kinetic (FIG. 9) characteristics demonstrate that the photochromic properties of the photochromic oligomer IV were suitable for practical applications.

Example 5

A polyester VII was synthesized from 1,2-bis(5-hydroxymethyl-2-methylthiophen-3-yl)hexafluoropentene (compound V) and terephthaloyl dichloride (VI) of according to the scheme shown below:

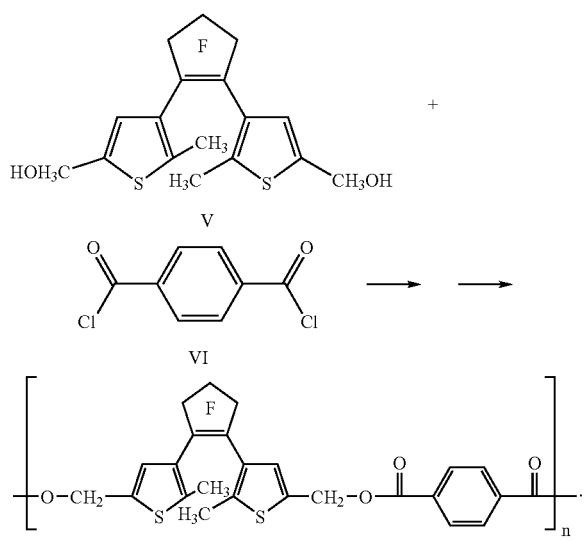

0.27 g (0.63 mmol) of 1,2-bis(5-hydroxymethyl-2-methylthiophen-3-yl)hexafluoropentene (compound V), 0.128 g (0.63 mmol) of terephthaloyl dichloride(VI) and 3.2 ml of dichloroethane were put into a 25 ml three-neck flask provided with a stirrer, a backflow condenser and an argon inlet. The reaction mixture temperature was increased up to 40° C., then 0.154 g of pyridine was slowly, during several minutes, added dropwise to the reaction mixture. The reaction time was 2 hours. Then the reaction mixture was poured into methanol, the precipitate was dried under vacuum for 24 hours at 40° C. The yield of polymer VII was 98%. IR (KBr, cm$^{-1}$): C=O 1710. Mn=35000. The polymer is soluble in tetrahydrofurane, dimethylformamide, ethanol, and acetone, and in chloroform when heated, and is insoluble in toluene.

Figure 10:
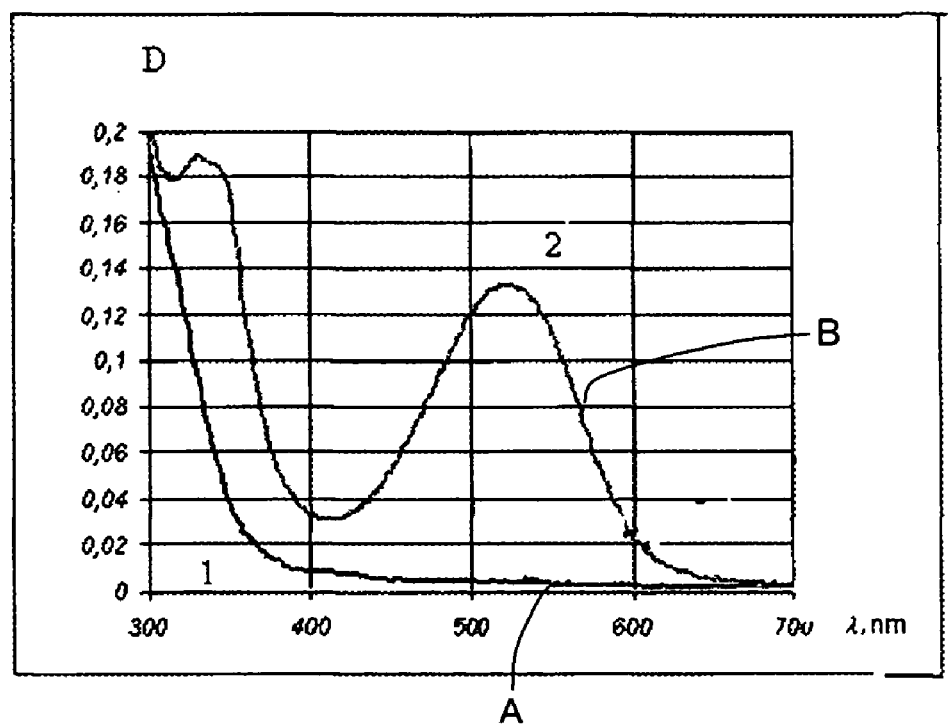
FIG. 10 shows absorption spectra of an initial open form A (curve 1) and a photoinduced form B (curve 2) for a film of the photochromic polymer VII synthesized in Example 5 in polycarbonate (10 wt. % of dry polymer weight) before and after exposure to UV light, respectively according to an aspect of the invention.
Figure 11:
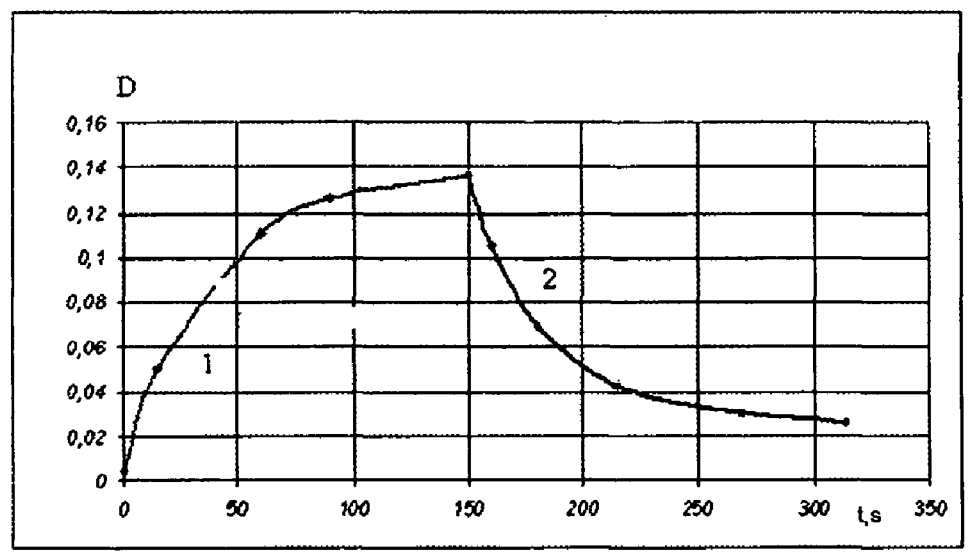
FIG. 11 shows kinetic curves of photocoloration by UV light (curve 1) and photobleaching by visible light (curve 2) for a film of the photochromic oligomer VII in polycarbonate (10 wt. % of dry polymer weight) at the wavelength of the maximum in the absorption band of the cyclic form B according to an aspect of the invention.

A sample of the photochromic polymer for measuring spectral and kinetic characteristics was prepared by joint dissolution of the photochromic polymer and polycarbonate, which was used as a polymer binder, in chloroform. Then the solution was sprayed on a quartz substrate by centrifuging method. As the result, a photochromic film was formed, for which absorption spectra of the form A (FIG. 10, curve 1) and the form B (FIG. 10, curve 2), and also kinetic curves of photocoloration (FIG. 11, curve 1) and photobleaching (FIG. 11, curve 2) were measured using the method described in Example 1.

The obtained spectral and kinetic data demonstrate the photochromism of the obtained sample of the photochromic film were suitable to for practical applications.

Example 6

A polyester VIIa was prepared from the compound V and isophthaloyl di-chloride similarly to Example 5:

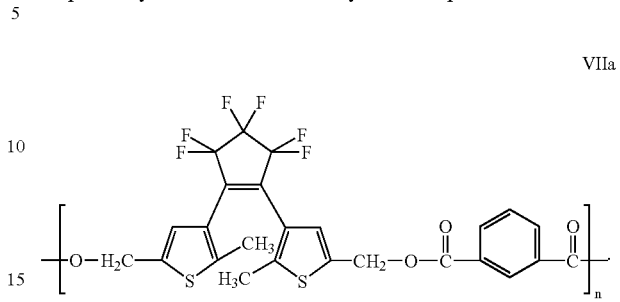

VIIa

The yield was 93%. Mn=28000. The polymer is soluble in chloroform, tetrahydrofurane, dimethylformamide, toluene, ethanol, and acetone. Spectral and kinetic characteristics of the photochromic polymer sample prepared by the method described in Example 5 demonstrate the photochromism suitable for practical applications.

Example 7

A polyester VIIb was prepared from the compound V and dichloride of 4,4'-biphenyldicarboxylic acid, similarly to Example 5:

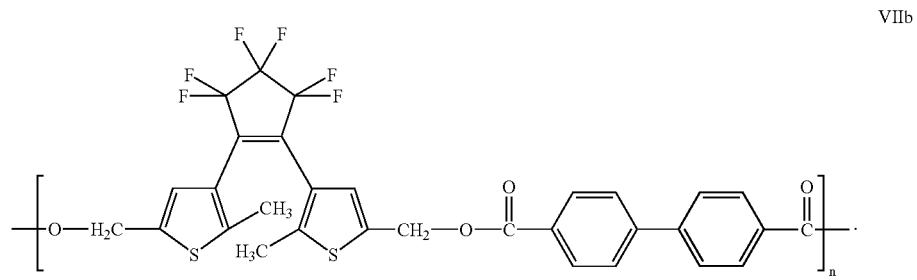

VIIb

The yield was 89%. Mn=22000. The polymer is soluble in chloroform, tetrahydrofurane, dimethylformamide, and is insoluble in toluene, ethanol, and acetone.

Spectral and kinetic characteristics of the photochromic polymer sample prepared by the method described in Example 5 demonstrate the photochromism suitable for practical applications.

Example 8

A polyester VIIc was prepared from compound V and dichloride of 4,4'-oxybis(benzoic acid), similarly to Example 5:

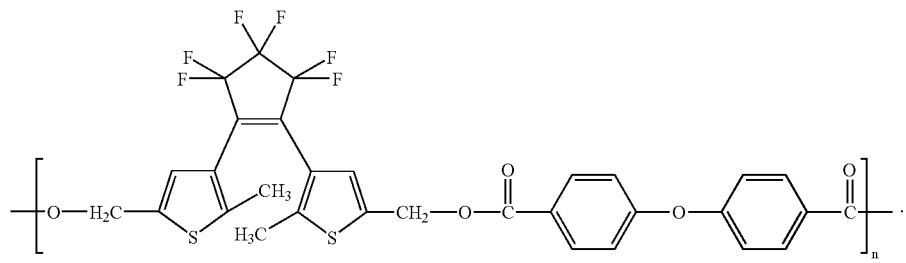

VIIc

The yield was 91%. Mn=24000. The polymer is soluble in chloroform, tetrahydrofurane, dimethylformamide, toluene, ethanol, and acetone. Spectral and kinetic characteristics of the photochromic polymer sample prepared by the method described in Example 5 demonstrate the photochromism suitable for practical applications.

Example 9

A polyester VIId was prepared from the compound V and dichloride of 4,4'-diphenylmethane dicarboxylic acid, similarly to Example 5:

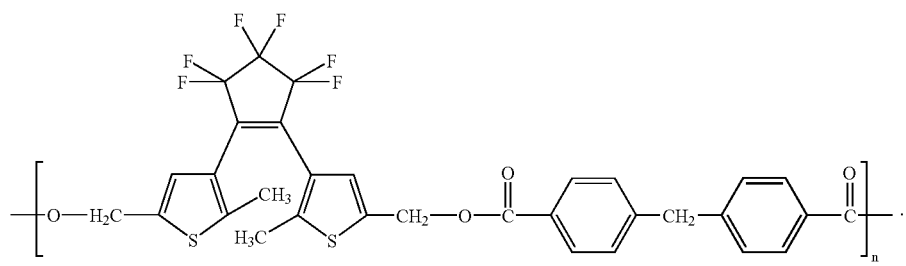

VIId

The yield was 96%. Mn=30000. The polymer is soluble in chloroform, tetrahydrofurane, dimethylformamide, toluene, ethanol, and acetone. Spectral and kinetic characteristics of the photochromic polymer sample prepared by the method described in Example 5 demonstrate the photochromism suitable for practical applications.

Example 10

A photochromic copolymer IX was synthesized from 3-allyl-4,5-bis(2,5-dimethyl-3-thienyl)-1,3-oxazole-2-one (compound VII) from the group II and methylmethacrylate according to the scheme presented below:

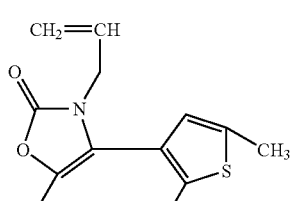

VIII

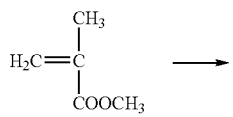

-continued

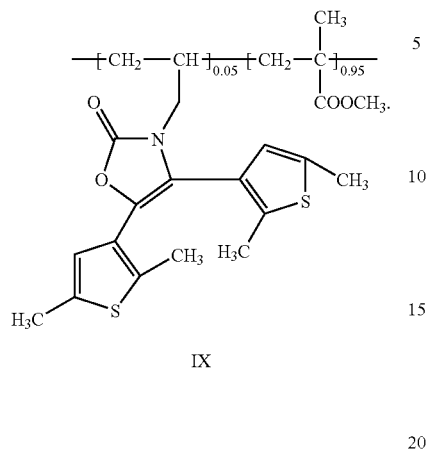

IX

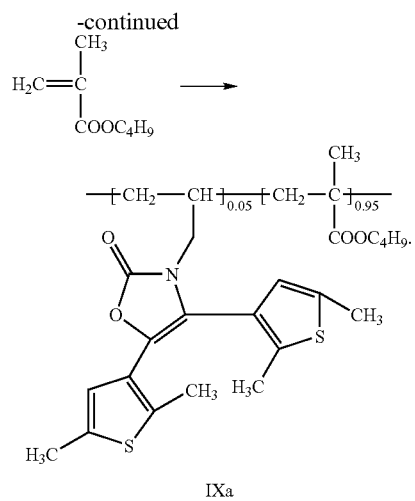

IXa

A solution of 0.173 g (0.5 mmol) of 3-allyl-4,5-bis(2,5-dimethyl-3-thienyl)-1,3-oxazole-2-one (compound VIII) in 1 g (10 mmol) of methylmethacrylate was placed in an ampoule containing 0.0017 g (0.1 wt. % of the total amount of the monomers) of a polymerization initiator being azoisobutyronitrile. The ampoule was filled with argon and was heated at 60° C. for 20 hours. Glassy copolymer methacrylate IX was produced. Mw=80000. The copolymer is soluble in chloroform.

Figure 12:
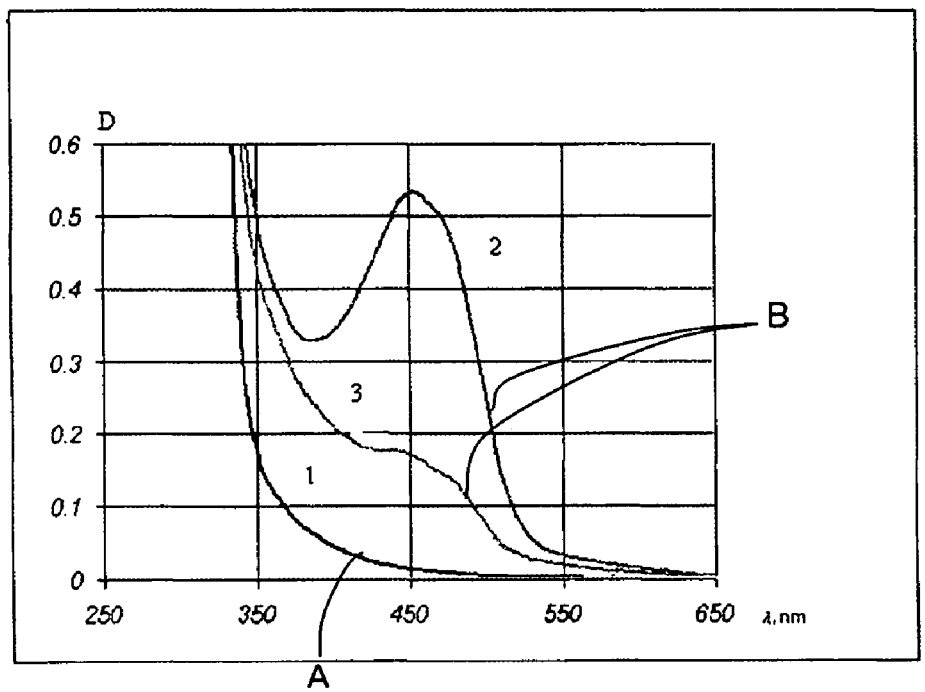
FIG. 12 shows absorption spectra of an initial open form A (curve 1) and a photoinduced form B after exposure to UV light via a UFS-2 light filter (curve 2) and subsequent exposure to visible light via a ZS-12 light filter (curve 3) for a film of the photochromic polymer IX synthesized in Example 10 in polycarbonate (4 wt. % of dry polymer weight) before and after exposure to UV light, respectively according to an aspect of the invention.
Figure 13:
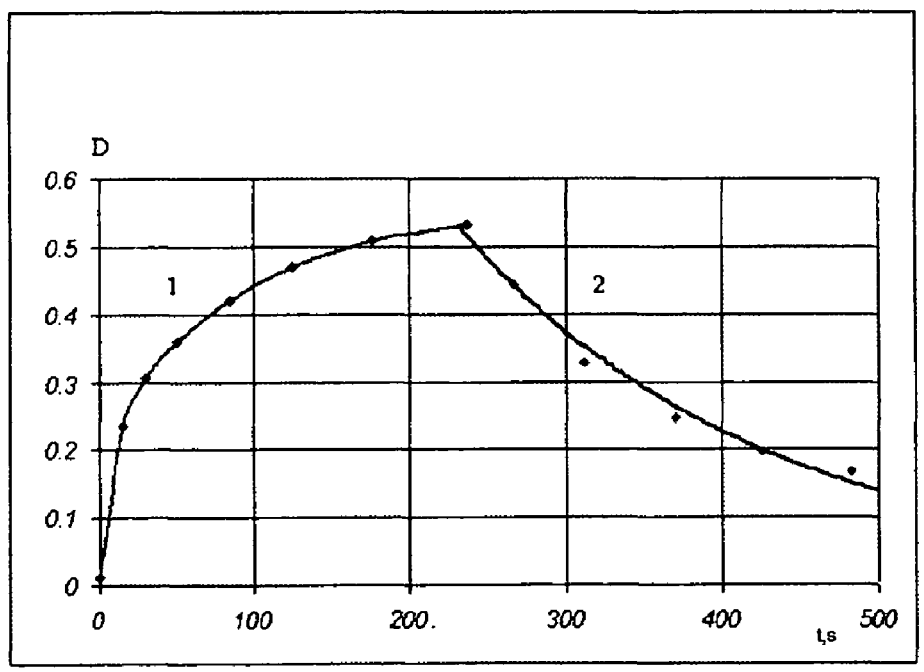
FIG. 13 shows kinetic curves of photocoloration by UV light (curve 1) and photobleaching by visible light (curve 2) for a film of the photochromic polymer IX in polycarbonate (4 wt. % of dry polymer weight) at the wavelength of the maximum in the absorption band of the cyclic form B according to an aspect of the invention.

A sample of the photochromic polymer was prepared by the method described in Example 5. Absorption spectra (FIG. 12) and kinetic curves for photobleaching and photocoloration processes (FIG. 13) demonstrate the usable photochromic properties of this polymer.

Example 11

A photochromic copolymer IXa was prepared from the compound VIII and butyl metacrylate, similarly to Example 10 Mw=92000.

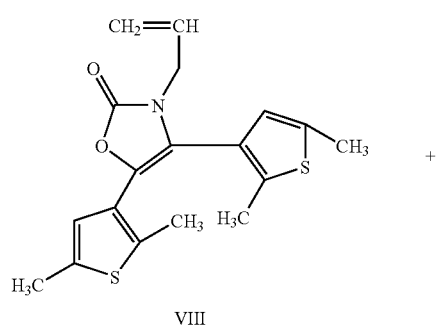

VIII

+

The polymer is soluble in chloroform. Spectral and kinetic characteristics of the photochromic polymer sample prepared by the method described in Example 5 demonstrate the photochromism are suitable for practical applications.

Figure 14:
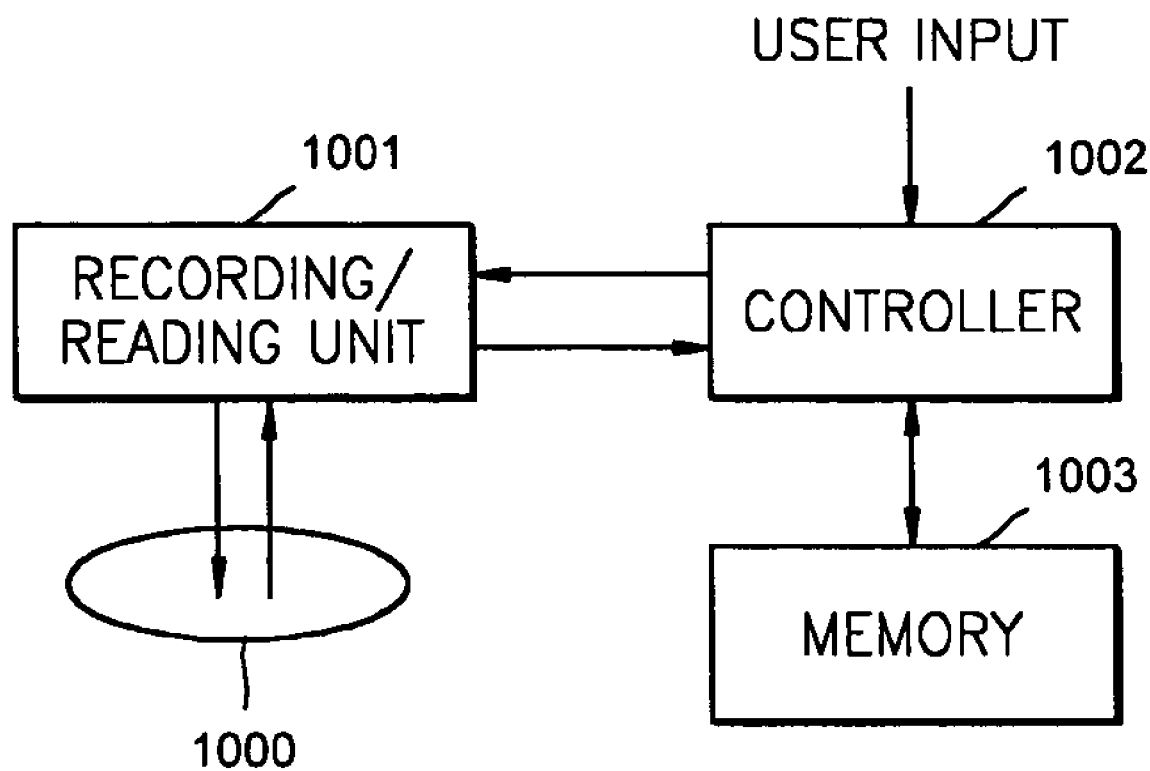
FIG. 14 is a block diagram of a recording and/or reproducing apparatus using the photochromic recording media according to an embodiment of the present invention.

FIG. 14 is a block diagram of a recording and/or reproducing apparatus according to an embodiment of the present invention. Referring to FIG. 14, the recording and/or reproducing apparatus includes a recording/reading unit 1001, a controller 1002, and a memory 1003. The recording/reading unit 1001 records data on a disc 1000, which is an embodiment of an information storage medium 1000 of the present invention, and/or reads the data from the disc 1000. The controller 1002 records and/or reproduces the data transferred using the recording/reading unit 1001 and controls the recording/reading unit 1001 to read and/or record the data.

While not required in all aspects, it is understood that the controller 1002 can be computer implementing the method using a computer program encoded on a computer readable medium. The computer can be implemented as a chip having firmware, or can be a general or special purpose computer programmable to perform the method.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A condensation-type photochromic polymer having a structural unit in a main chain derived from photochromic monomers of the general formula (I):

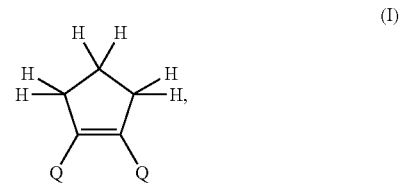

(I)

wherein:
each of the substituents Q is independently selected from below,

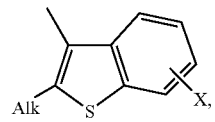 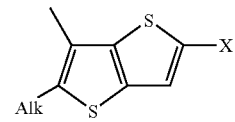

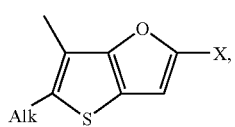 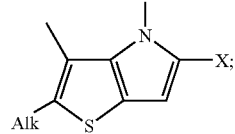

Alk is a C1-10 alkyl group; and
X is Cl, Br, I, F, NH2, CH2OH, CH2Cl, CH2Br, CHO, or COOH.

2. The photochromic polymer as claimed in claim 1, wherein the photochromic polymer is a copolymer of the chemical formula (IV):

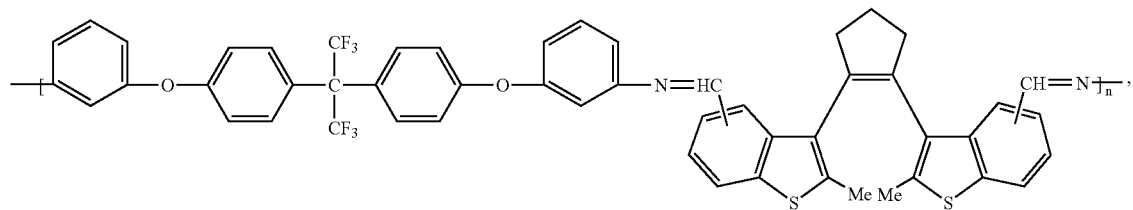

wherein n is a positive integer.

3. A photochromic polymer having in a main chain a structural unit of the general formula (IXa'):

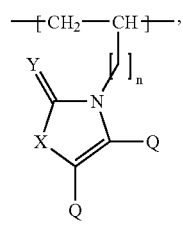

wherein:
X is CH2, O, S or N-Alk; Y is O, S, or N-Alk;
n is any integer of 0~6;
each of the substituents Q is independently selected from below,

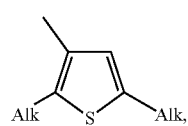 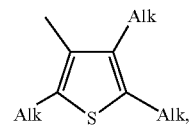

-continued

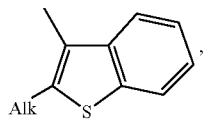 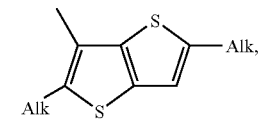

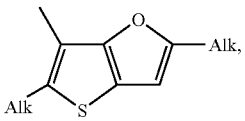 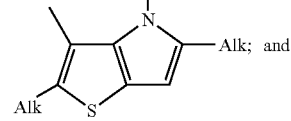

Alk is a C1-10 alkyl group.

4. The photochromic polymer as claimed in claim 3, wherein the photochromic polymer is a copolymer of the chemical formula (IX):

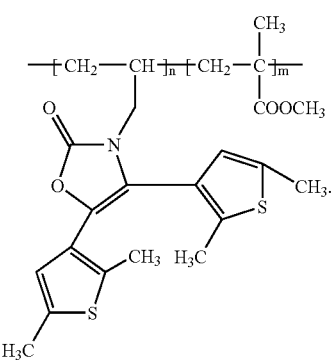

wherein n≠0 and m≠0, and n and m represent relative molar amounts.

5. The photochromic polymer as claimed in claim 3, wherein the photochromic polymer is a copolymer of the chemical formula (IXa):

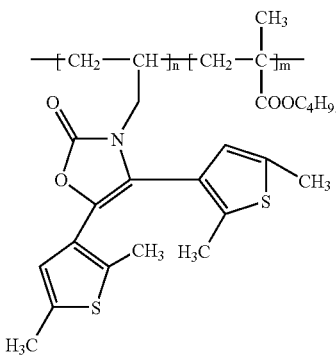

wherein n≠0 and m≠0, and n and m represent relative molar amounts.

6. A photochromic polymer, wherein the photochromic polymer is a polyester of the chemical formula (VII):

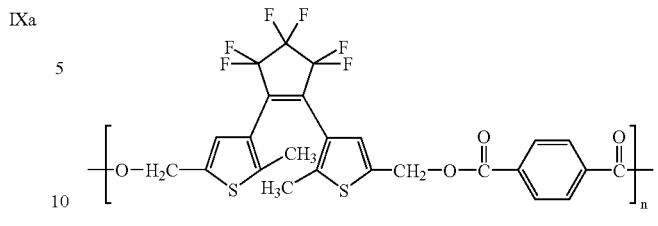

wherein n is a positive integer.

7. A photochromic polymer, wherein the photochromic polymer is a polyester of the chemical formula (VIIa):

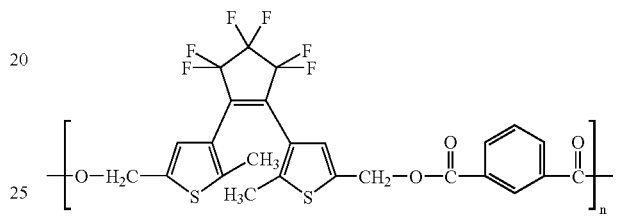

wherein n is a positive integer.

8. A photochromic polymer, wherein the photochromic polymer is a polyester of the chemical formula (VIIb):

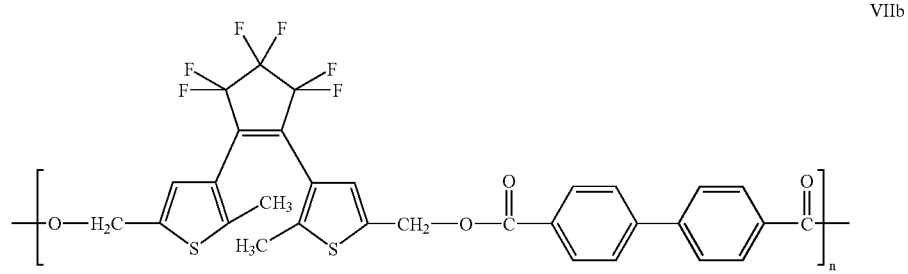

wherein n is a positive integer.

9. A photochromic polymer, wherein the photochromic polymer is a polyester of the chemical formula (VIIc):

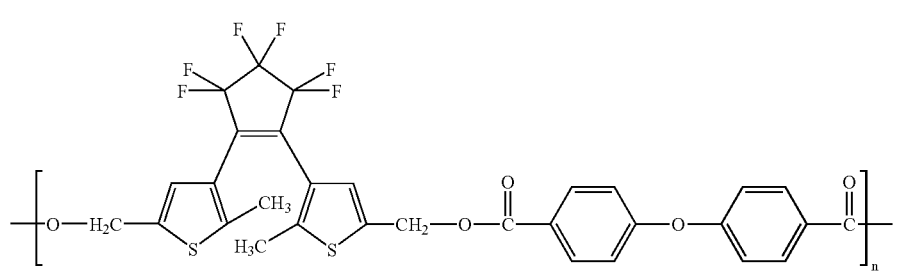

wherein n is a positive integer.

10. A photochromic polymer, wherein the photochromic polymer is a polyester of the chemical formula (VIId):

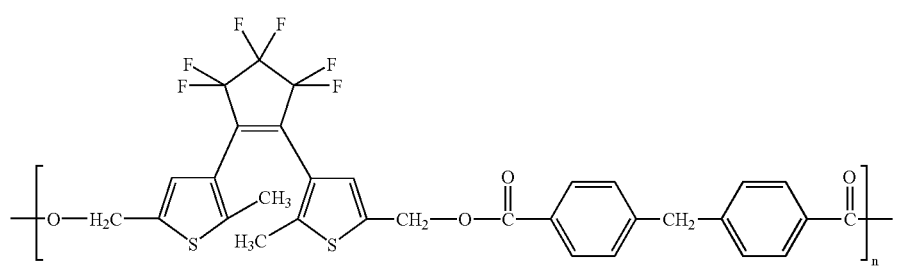

VIId wherein n is a positive integer.

11. A photochromic polymer mixture comprising:
1~99% by weight of the photochromic polymer according to claim 1; and
99~1% by weight of a polymer binder.

12. The photochromic polymer mixture as claimed in claim 11, wherein the polymer binder is at least one selected from the group consisting of vinyl-based polymers, polymers of an ethylenically unsaturated monomer, acrylics polymers, polyesters, polycarbonates, polyimides and polyamides.

13. A photochromic recording medium comprising the photochromic polymer according to claim 1.

14. The photochromic recording medium as claimed in claim 13, wherein the recording medium is used as a 3D read/write optical memory.

15. The photochromic recording medium as claimed in claim 13, wherein the recording medium is a two-photon photochromic recording medium capable of bit-by-bit recording of optical information.

16. A photoswitch of optical signals comprising the photochromic polymer according to claim 1.

17. A photochromic polymer mixture comprising:
1~99% by weights of the photochromic polymer according to claim 3; and
99~1% by weight of a polymer binder.

18. A photochromic polymer mixture comprising:
1~99% by weight of a photochromic polymer selected from the group consisting of

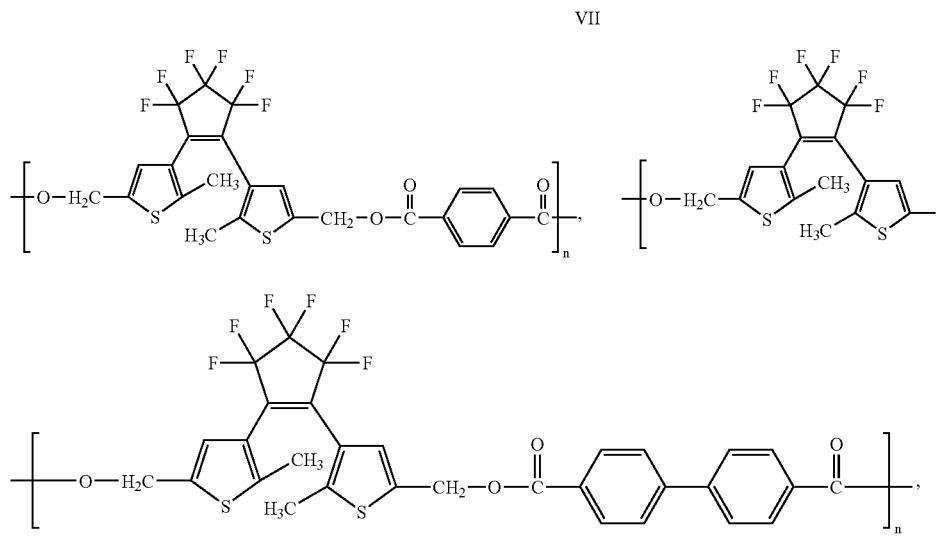

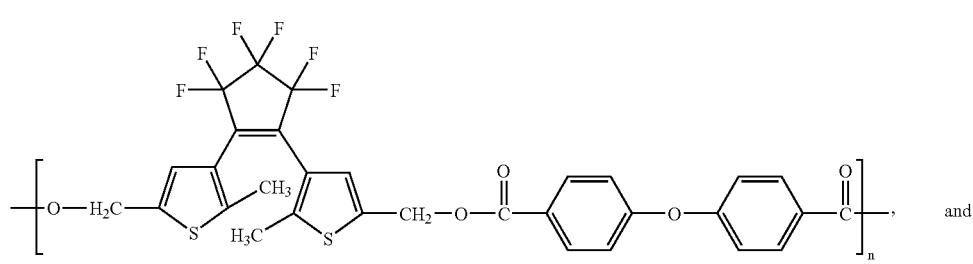

-continued

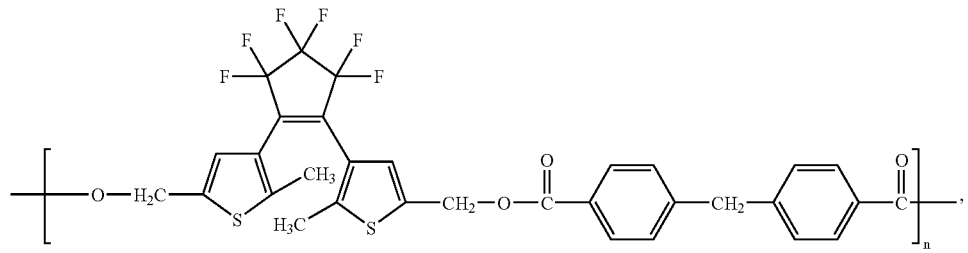
VIId wherein n is a positive integer; and

99~1% by weight of a polymer binder.

19. A photochromic recording medium comprising the photochromic polymer according to claim 3.

20. A photochromic recording medium comprising the photochromic polymer mixture according to claim 11.

21. A photochromic recording medium comprising the photochromic polymer mixture according to claim 17.

22. A photochromic recording medium comprising the photochromic polymer mixture according to claim 18.

23. A photoswitch of optical signals comprising the photochromic polymer according to claim 3.

24. A photoswitch of optical signals comprising the photochromic polymer mixture according to claim 17.

25. A photoswitch of optical signals comprising the photochromic polymer mixture according to claim 18.

* * * * *